United States Patent
Beaty et al.

(10) Patent No.: US 10,412,468 B1
(45) Date of Patent: Sep. 10, 2019

(54) INTEGRATING ACHIEVEMENTS INTO VIDEO PLAYBACK

(71) Applicant: RedCritter Corp., Flower Mound, TX (US)

(72) Inventors: Robert M. Beaty, Flower Mound, TX (US); Randy M. Whelan, Coppell, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 0 days.

(21) Appl. No.: 15/968,600

(22) Filed: May 1, 2018

(51) Int. Cl.
*H04N 21/81* (2011.01)
*H04N 21/472* (2011.01)

(52) U.S. Cl.
CPC ... *H04N 21/8126* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 8,832,741 | B1* | 9/2014 | Bota | H04N 21/2365 725/40 |
| 2007/0260677 | A1* | 11/2007 | DeMarco | H04N 21/4825 709/203 |
| 2013/0051754 | A1* | 2/2013 | Gilpin | H04N 21/4756 386/241 |
| 2019/0075340 | A1* | 3/2019 | Hochart | H04L 51/02 |

* cited by examiner

*Primary Examiner* — Omar S Parra
(74) *Attorney, Agent, or Firm* — Kirton McConkie; Brian Tucker

(57) ABSTRACT

Achievements can be integrated into video playback. A video achievement system can include a server process and a client process that interact to allow an administrator to integrate achievements into the playback of a video and to present such achievements to a user during playback. In this way, the viewing of videos can be encouraged.

20 Claims, 26 Drawing Sheets

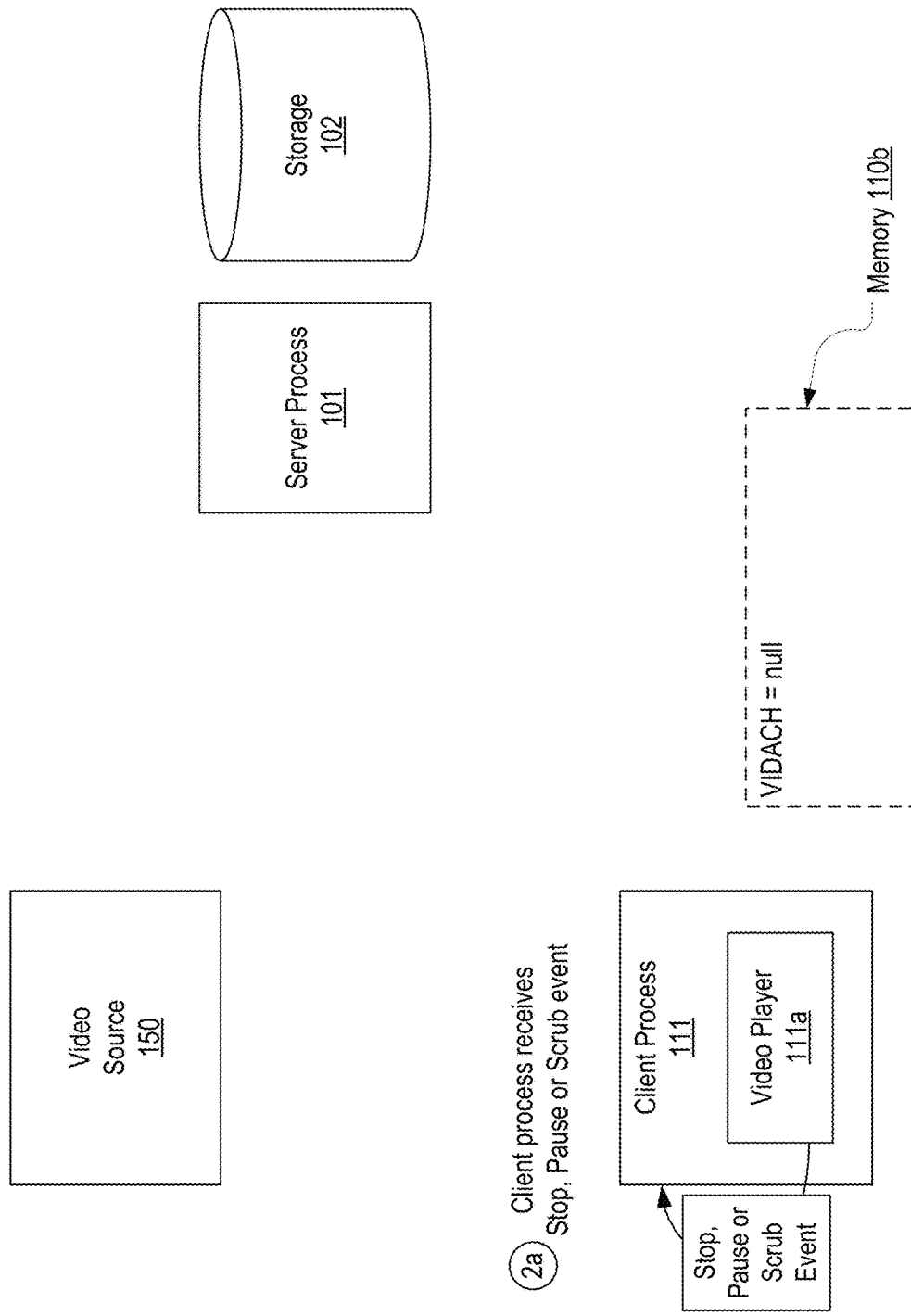

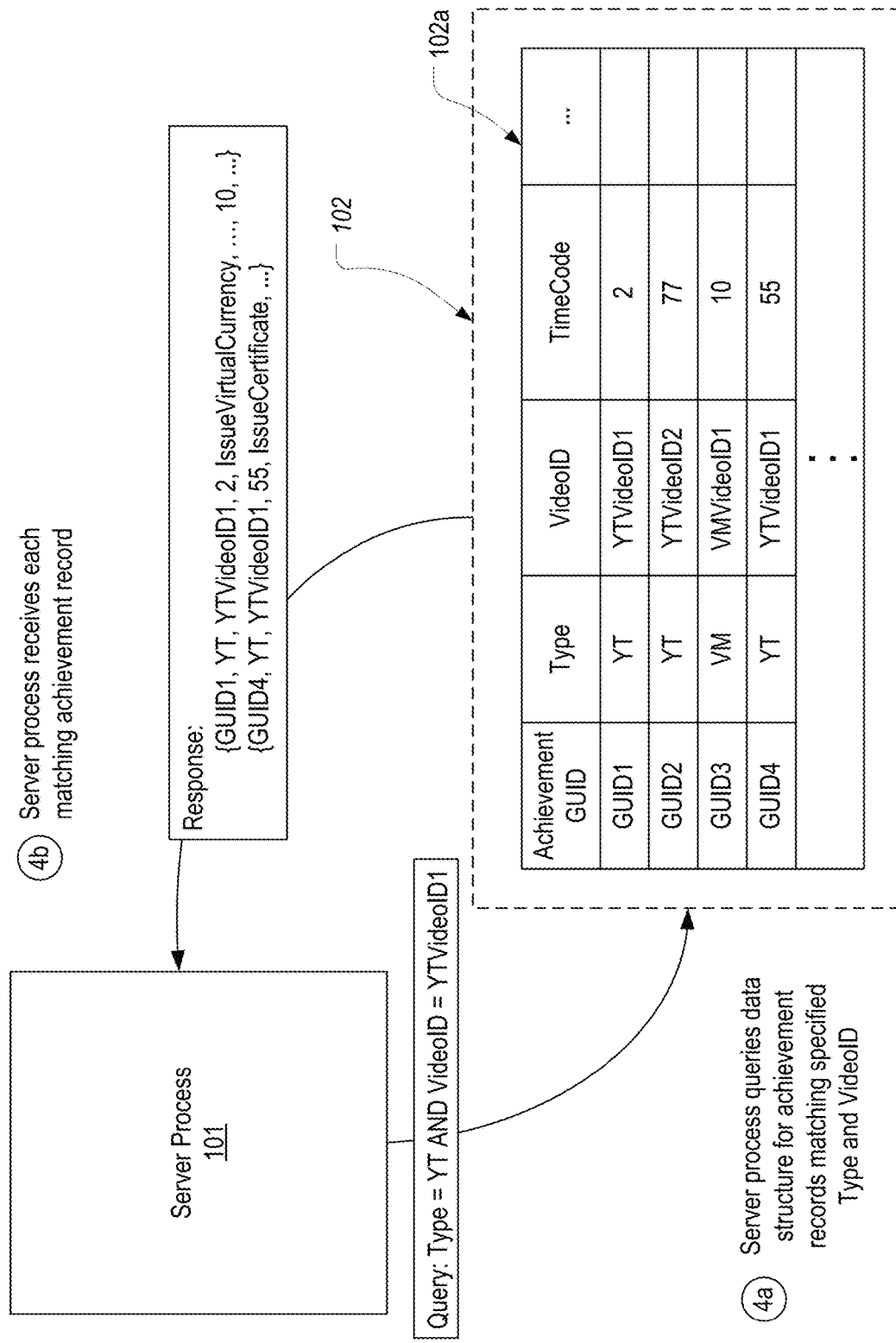

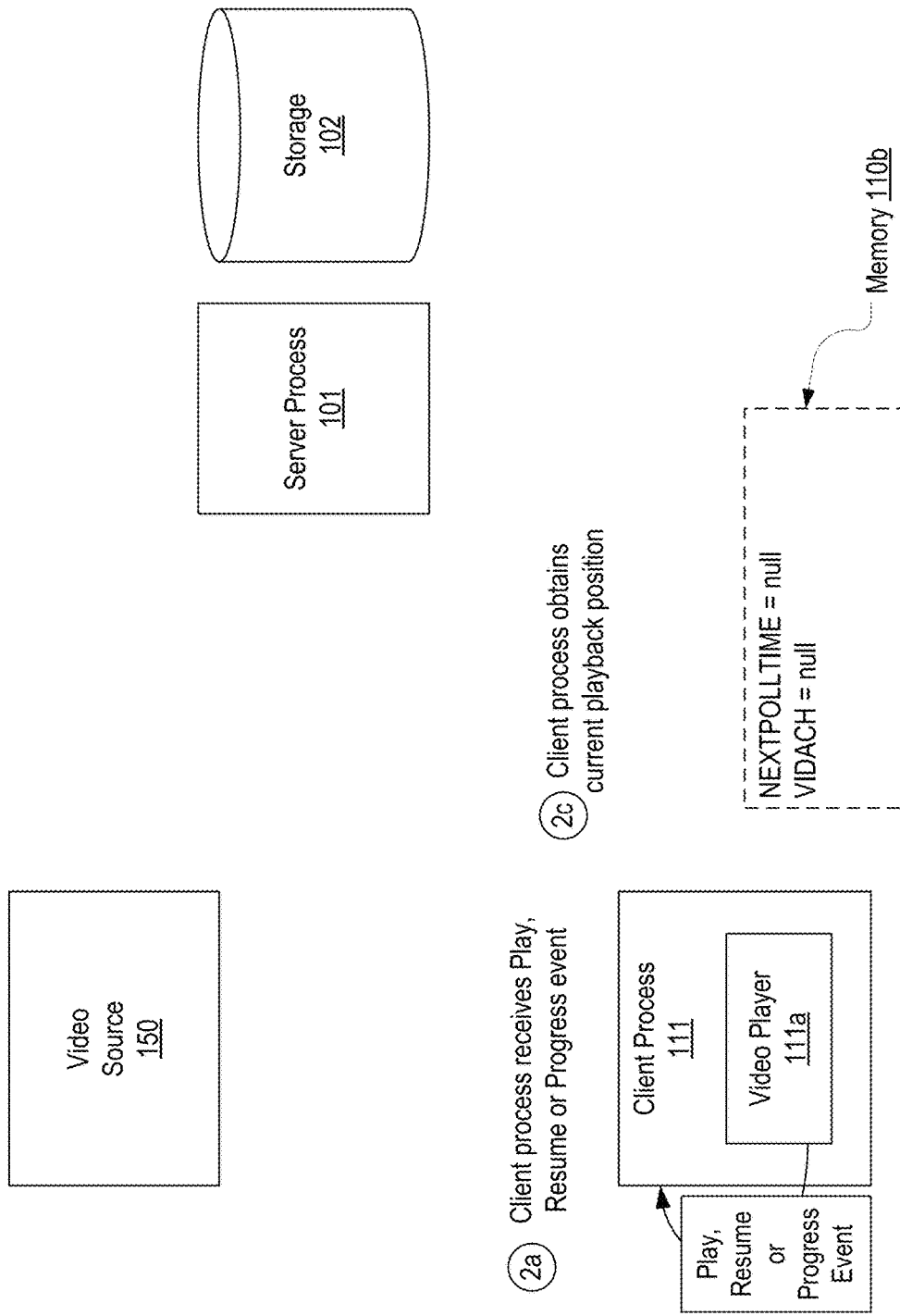

INTEGRATING ACHIEVEMENTS INTO VIDEO PLAYBACK

CROSS-REFERENCE TO RELATED APPLICATIONS

N/A

BACKGROUND

HTML5 is the current standard for structuring and presenting content within a browser. HTML5 introduced features for handling multimedia natively including the <video> element for embedding video within any web page and the associated Document Object Model (DOM) for enabling access to the <video> element using JavaScript. Using the <video> element, a video can be embedded into any web page and played within any browser that supports HTML5.

A number of player APIs have been developed to facilitate using a third party video player. For example, Google provides the IFrame Player API that developers can employ to embed YouTube videos into their web pages, and Vimeo provides the Player API for embedding Vimeo videos. In each case, these player APIs are built upon the HTML5 DOM. It is also possible to develop a custom player that interfaces directly with the HTML5 DOM as opposed to employing a third party API. The present invention can be implemented to employ any of these third party APIs or to interface directly with the HTML5 DOM.

BRIEF SUMMARY

The present invention extends to methods, systems, and computer program products for integrating achievements into video playback. A video achievement system can include a server process and a client process that interact to allow an administrator to integrate achievements into the playback of a video and to present such achievements to a user during playback. In this way, the present invention can be employed to encourage viewing of videos.

In one embodiment, the present invention is implemented by a client process and a server process as a method for integrating achievements into playback of a video. During playback of a video within a video player, the client process generates and displays a timeline overlay in conjunction with the video player. The client process includes in the timeline overlay an anchor that corresponds with a particular playback position within the video. The client process receives input that selects an add feature associated with the anchor. In response to the selection of the add feature, the client process generates and displays an option to define an achievement to be associated with the particular playback position to which the anchor corresponds. In response to receiving input that defines the achievement, the client process send a request to the server process to create an achievement record that associates the input that defines the achievement with the particular playback position within the video.

In another embodiment, the present invention is implemented as computer storage media storing computer-executable instructions which when executed by one or more processors implement a method for integrating achievements into playback of a video. This method includes: monitoring playback of a video while an administrator is viewing the video; in response to a playback event, sending, by a client process, a request to a server process for achievement records that are associated with the video; receiving, from the server process, a set of achievement records where each achievement record associates a particular achievement with a particular playback position within the video; generating and displaying, by the client process, a timeline overlay in conjunction with the video player; and adding to the timeline overlay and for each achievement record, an achievement icon at a position that corresponds with the particular playback position with which the corresponding achievement is associated.

In another embodiment, the present invention is implemented as a method for integrating achievements into playback of a video. Playback of a video is monitored while a user is viewing the video. In response to a playback event, a current playback position of the video is obtained. A request is then sent from a client process to a server process which includes the current playback position and an identifier of the video. In response to the request, the client process receives from the server process a set of achievement records where each achievement record is associated with the video and with a particular playback position that is within an offset from the current playback position. In conjunction with the playback of the video, an award element is generated and displayed for at least one of the achievement records in the set.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3E illustrate a process by which an administrator can retrieve achievement records applicable to a particular video;

FIGS. 5A-5H illustrate a process by which achievements to be displayed while a user watches a particular video can be identified and retrieved.

DETAILED DESCRIPTION

Figure 1:
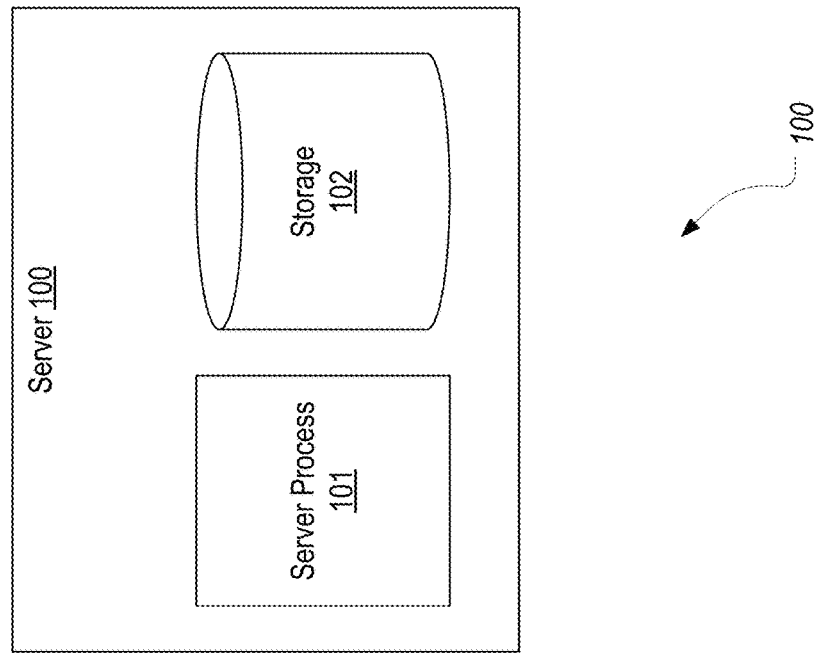
FIG. 1 illustrates an example client/server computing environment in which the present invention can be implemented.
Figure 1:
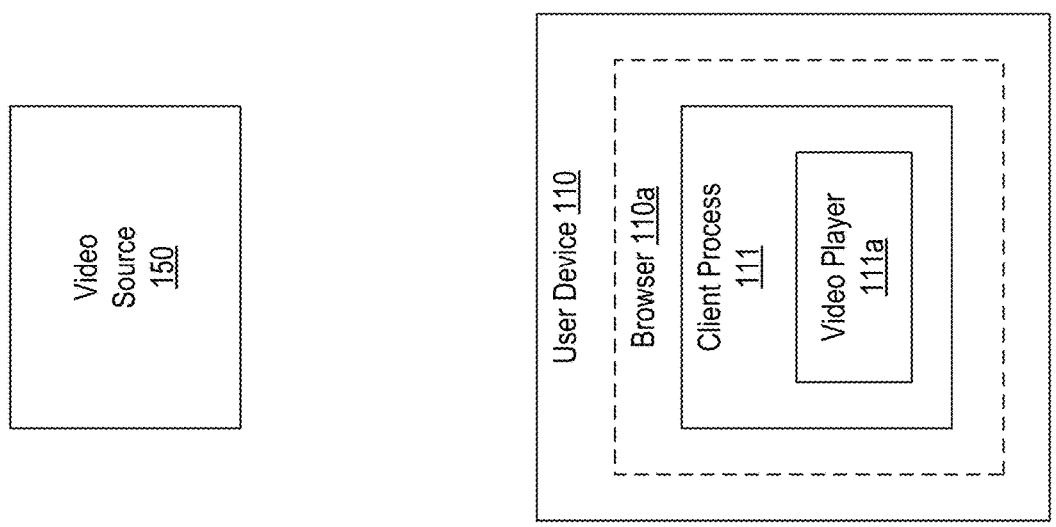

FIG. 1 depicts an example computing environment 100 in which the present invention can be implemented. Environment 100 includes a server 100, a user device 110 and a video source 150. Video source 150 may typically represent a third party video provider such as YouTube or Vimeo. However, video source 150 may be any source of video that can be provided to user device 110. In some embodiments, video source 150 could be part of server 100 or even part of user device 110 (e.g., a localhost server). In short, the origin of the videos is not important.

User device 110 can represent any computing device (e.g., desktops, laptops, tablets, smartphones, smart TVs, etc.) that is capable of rendering video content. User device 110 may typically include a browser 110a in which HTML5 video content is rendered. However, it is possible that user applications other than browsers could be configured to render the HTML5 video content, and therefore, browser 110a is shown in dashed lines to represent that it is optional. Although this specification will refer to HTML5, the present invention would extend to any subsequent versions of the HTML standard or other similar standards/techniques that may be employed to deliver video content to a user device.

A client process 111 can be executed on user device 110 for the purpose of implementing the techniques of the present invention. In browser-based implementations, client process 111 may typically be a JavaScript program. Client process 111 implements a video player 111a. As an example, client process 111 could employ the HTML5<video> element to implement video player 111a as is known in the art.

Figure 2:
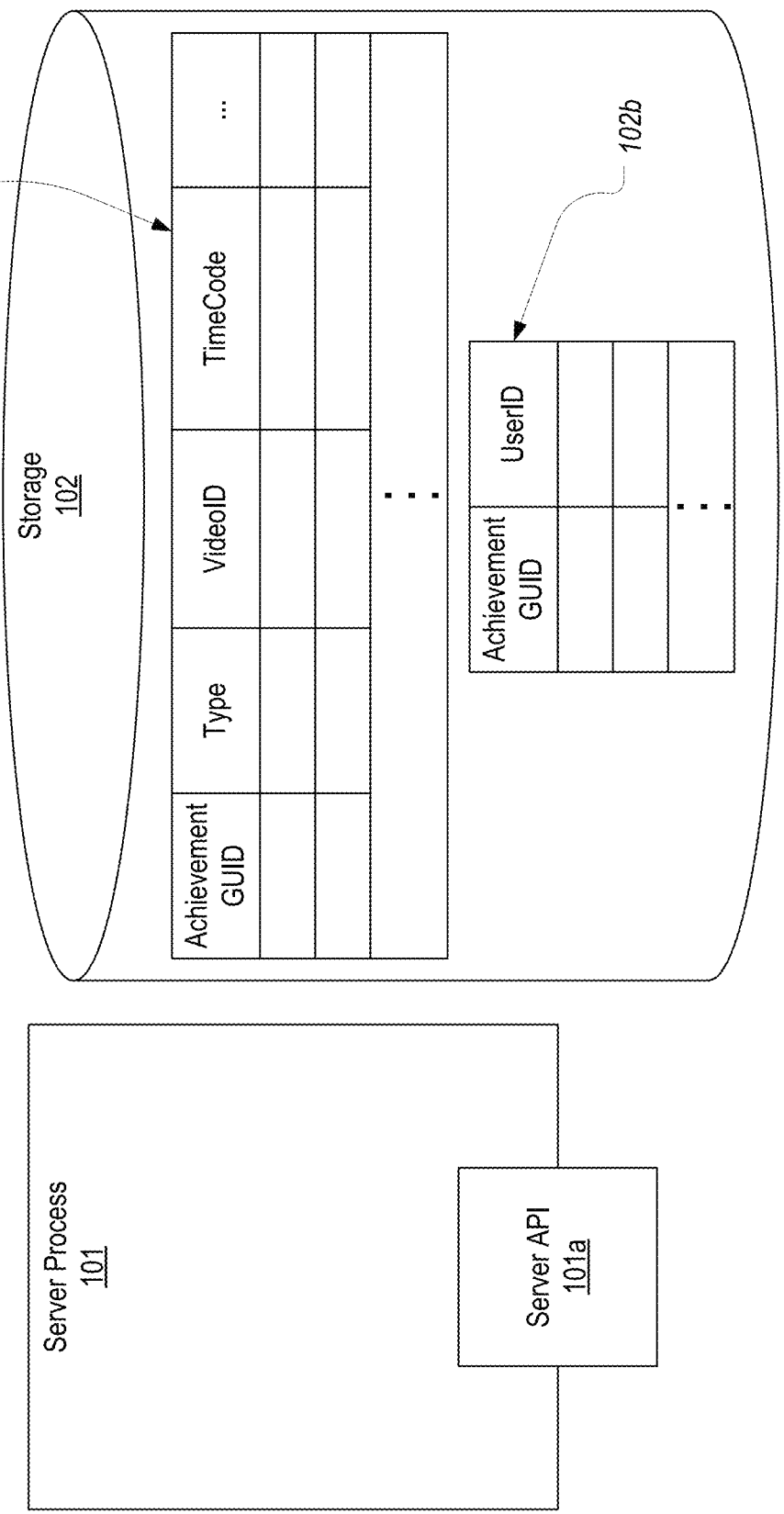
FIG. 2 illustrates an example architecture of the server in the example computing environment.

Server 100 can represent any computing device or group of computing resources (e.g., a cloud) that is configured to function as a server. Server 100 executes a server process 101 and implements or interfaces with a storage 102. FIG. 2 provides a more detailed view of the architecture of server 100. As shown, server process 101 can include a server API 101a by which client process 101 can communicate with server process 101. By way of example only, server API 101a may be implemented as a RESTful API. Storage 102 is employed to maintain a data structure 102a in which video achievement records (or simply "records") are stored. Each record defines an achievement within the system of the present invention.

As will be described in more detail below, data structure 102a (which may be a database, a table, or any other suitable structure) is configured to store records which may consist of the following fields: AchievementGUID (or GUID) which defines a globally unique identifier for the record; Type which defines the host (e.g., YouTube, Vimeo, etc.) of the video with which the record is associated; VideoID which defines the host's identifier for the video, and TimeCode which defines a timecode within the video with which the record is associated.

The present invention can be integrated with a number of different rewards systems. Depending on the reward system with which a particular implementation is integrated, each record in data structure 102a may also include additional fields such as: SecretKey which defines a key, token or other authorization input that the reward system can use to award the achievement defined by the record; Command which defines an award to issue when the achievement is earned (e.g., AwardBadge, IssueCertificate, IssueVirtualCurrency, IssueSkillPoints, etc.); ItemName which defines a unique name of the item to award (e.g., the "Great Job" badge); Title which defines a title for the associated achievement; Message which defines a message to send to the rewards system; Value which defines a numerical value for the award (e.g., 10 for a virtual currency award); ExpirationDate which defines an expiration date for an award; and IssueMatchingRewardPoints which defines whether a matching award should be issued.

Storage 102 may also maintain a data structure 102b in which records defining awarded achievements can be stored. As shown, each record in data structure 102b can include an AchievementGUID of the achievement that has been awarded and a UserID of the user to which the achievement was awarded.

FIGS. 3A-3E and 4A-4H illustrate a process by which an administrator can configure the system (i.e., the combination of server process 101, the contents of storage 102 and client process 111) to present achievements during playback of a particular video. It is assumed that this process is performed within example computing environment 100. However, various elements have been omitted from the figures to simplify the illustration. As mentioned above, an administrator could employ virtually any personal computing device to interface with client process 111 for the purpose of configuring the system to present achievements. As described more fully below, to prevent non-administrators from configuring the system, client process 111 and/or server process 101 can be configured to verify credentials of any user attempting access or to otherwise determine whether the current user has administrative rights to the system.

Figure 3A:
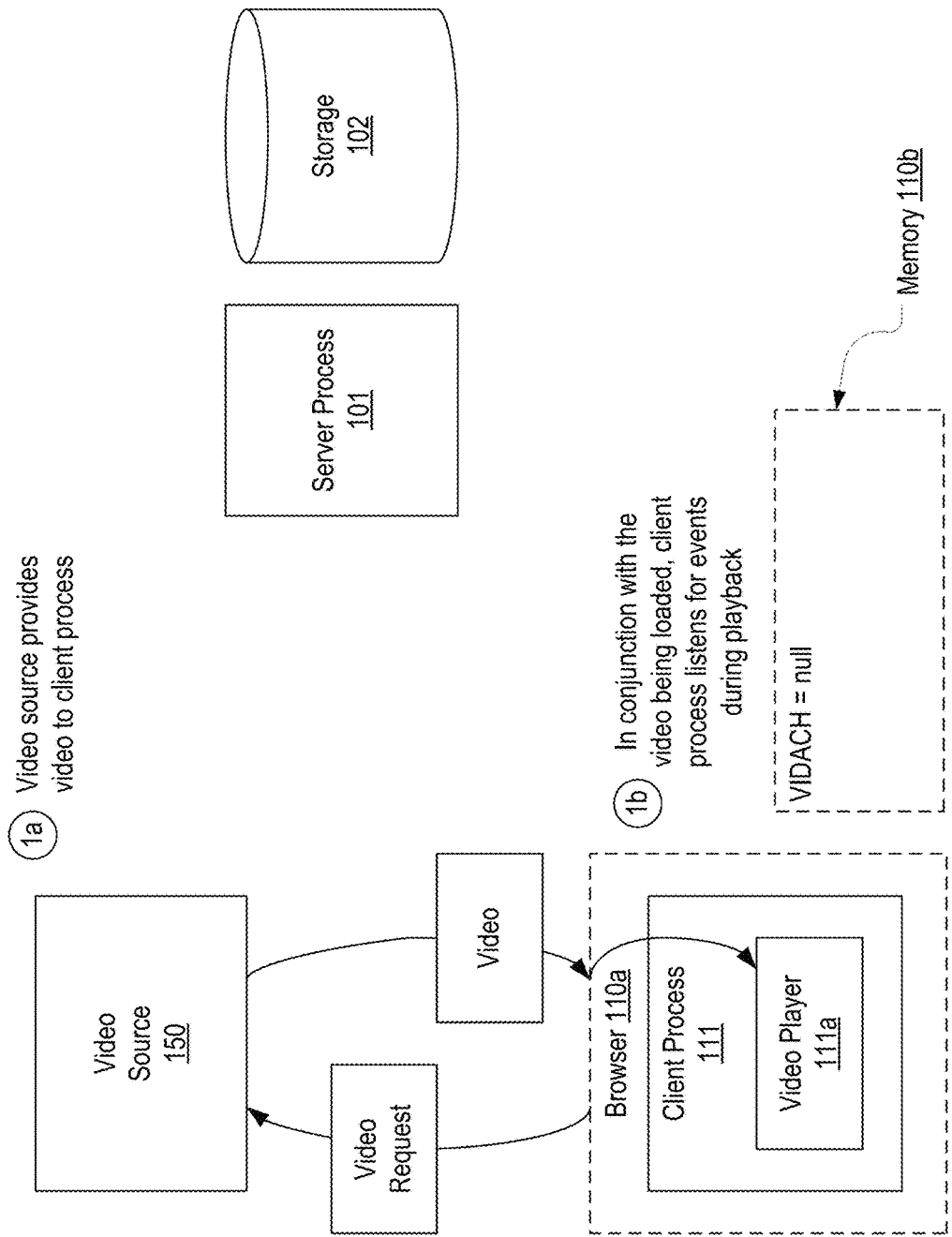

FIGS. 3A-3E illustrate how client process 111 can retrieve achievement records for a currently loaded video. FIG. 3A depicts the initial steps of requesting and loading a video for playback on user device 110. Typically, a user of user device 110 who has admin credentials may visit a webpage that includes embedded video and that is configured with client process 111 for the purpose of integrating achievements into a particular video. As mentioned above, the <video> element can be employed to embed video in the content of a webpage. As is known in the art, and as is represented in step 1a, as part of processing the <video> element, browser 110a will send a request to video source 150 for a particular video (e.g., based on a defined or requested URL). As a result, the video will be loaded for playback in video player 111a. In conjunction with the loading of the video, and as represented by step 1b, client process 111 can register to receive notifications when the state of video player 111a changes (e.g., by calling the addEventListener method to attach an event handler to the <video> element for each event to be handled). These state changes or events may include play, resume, stop, pause, progress, scrub or similar events. For purposes of this disclosure, a scrub event should be construed as an indication that the user has manually adjusted the playback position of the video (e.g., by clicking directly on the timeline or dragging the playhead).

In the context of configuring the system to present achievements during playback, client process 111 can register for pause, stop or scrub events so that the administrator can be presented with the option of configuring an achievement at a particular position within the video when the video is stopped, paused or moved to that position. For the sake of clarity, it is noted that the same client process 111 can be employed when either an administrator or end user is the current user. As will be described below, client process 111 can employ various variables in memory 110b to store data used within this process.

Turning to FIG. 3B, it is assumed that video player 111a is playing the video that was loaded in step 1b and that the administrator has interacted with video player 111a in a manner that causes a stop, pause or scrub event to be raised. Accordingly, in step 2a, client process 111 is shown as receiving the stop, pause or scrub event. In response, in step 2b, client process 111 can verify whether the current user is an administrator. This verification could be performed in any suitable manner as is known in the art (e.g., by verifying credentials (which may have been performed previously such as during a login process)). Client process 111 can verify whether the current user is an administrator to ensure that non-administrative users are not presented with the ability to configure the system to present achievements. Therefore, if, in response to a stop, pause or scrub event, client process 111 determines that the current user is not an administrator, it can in essence ignore the event.

Figure 3C:
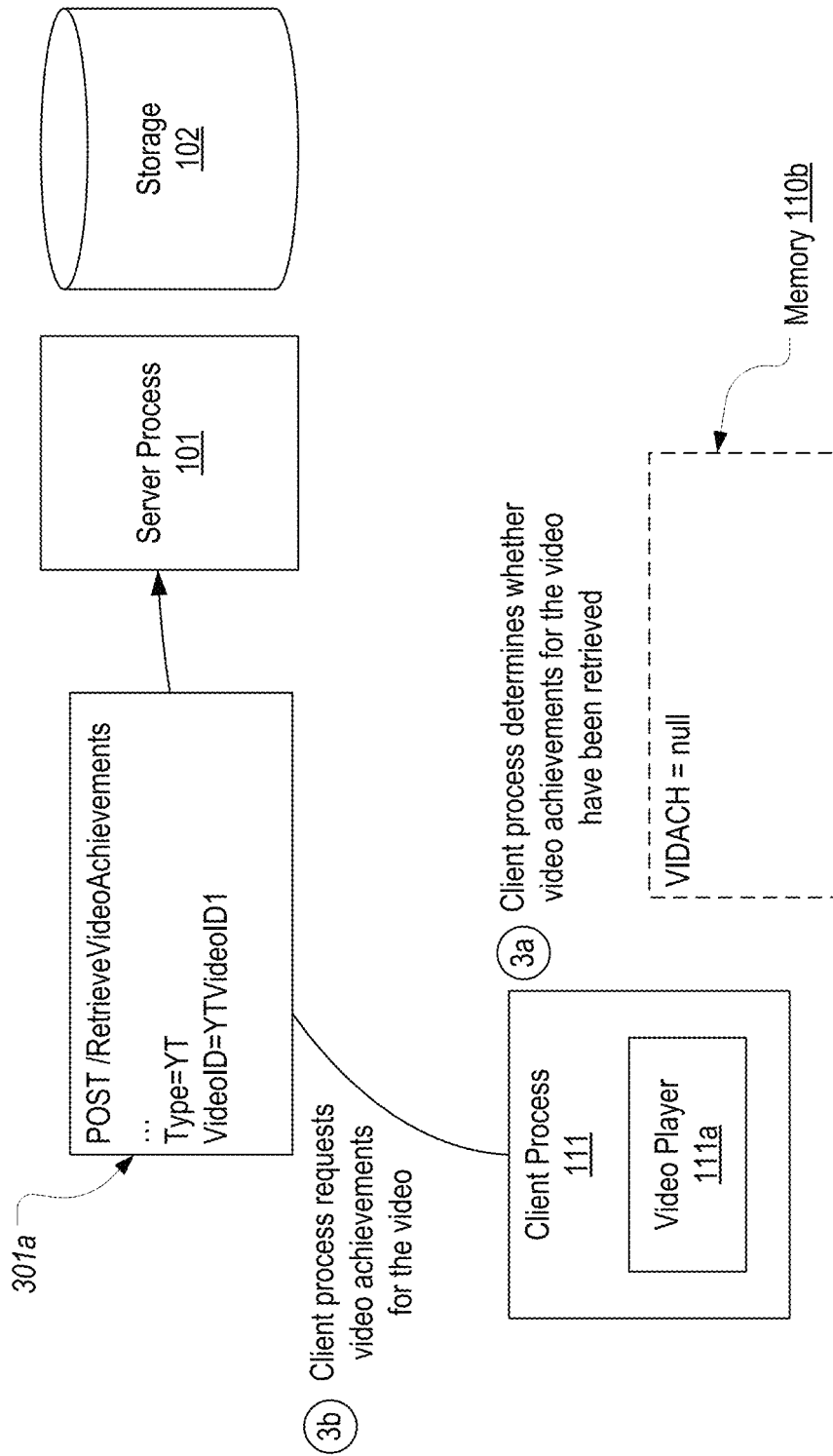

Next, in step 3a as shown in FIG. 3C, client process 111 determines whether any achievements that have been defined for the loaded video have been retrieved from server process 101. In this example, it will be assumed that client process 111 is configured to employ the VIDACH data structure to store video achievements for the currently loaded video and that the video achievements have not yet been retrieved as evidenced by VIDACH being set to null. If, however, the video achievements had already been obtained (e.g., if the stop, pause or scrub event that triggered the process had not been the first stop, pause or scrub event during playback), client process 111 could forgo the subsequent steps for retrieving the video achievements.

Given that client process 111 will determine that the video achievements for the current video have not yet been retrieved, it will generate and send a request 301a to server process 101 in step 3b. As shown, request 301a can specify the type of the currently loaded video (which is assumed to be YouTube or "YT" in this example) and the VideoID (which is assumed to be YTVideoID1). In embodiments where the system may only employ one type of video, the type parameter may not be necessary. However, in embodiments where multiple types of videos can be loaded, the type parameter can be employed to ensure that the VideoID will uniquely identify a single video (e.g., YouTube and Vimeo could possibly use the same identifier within their respective systems to identify two different videos). In this example, it is assumed that request 301a is in the form of an HTTP Post request to the RetrieveVideoAchievements endpoint of server API 101a.

As shown in step 4a of FIG. 3D, in response to request 301a, server process 101 can generate and send a query to storage 102 to retrieve each achievement record that matches the Type and VideoID defined in request 301a. In this example, it will be assumed that data structure 102a includes two matching achievement records such that server process 101 will receive these two achievement records in step 4b.

In this example, it will be assumed that one of the matching achievement records has a GUID of GUID1, is defined to be presented when playback of the YouTube video with an ID of YTVideoID1 reaches 2 seconds, represents an IssueVirtualCurrency achievement type, and has a value of 10 (i.e., 10 reward points will be issued when this achievement is awarded). It will also be assumed that the other matching achievement record has a GUID of GUID4, is defined to be presented when playback of the YouTube video with an ID of YTVideoID1 reaches 55 seconds, and represents an IssueCertificate achievement type.

Figure 3E:
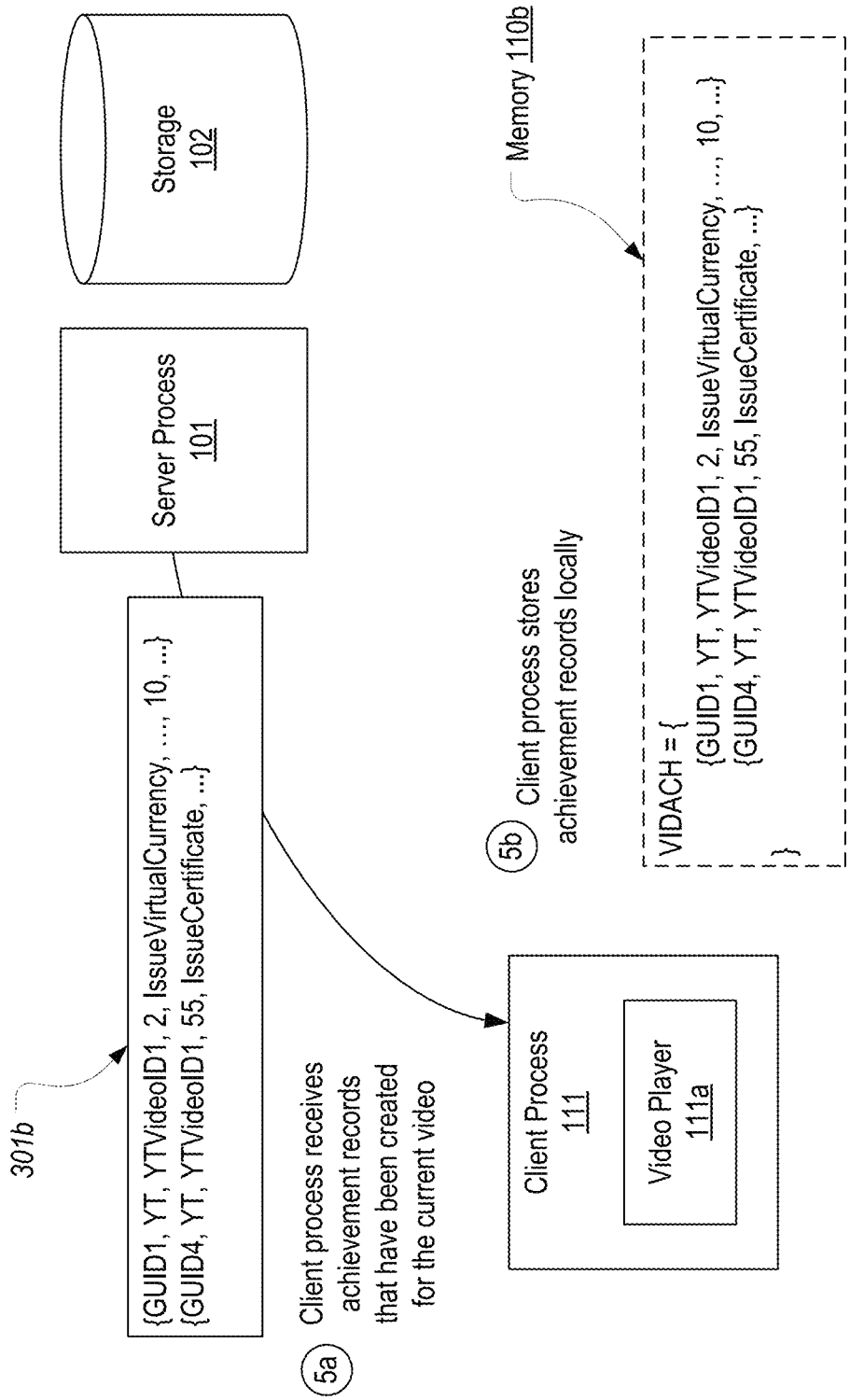

Finally, in step 5a shown in FIG. 3E, server process 101 sends response 301b to client process 111. Response 301b includes the contents of each achievement record that matched the parameters specified in request 301a. Then, in step 5b, client process 111 stores the achievement records locally (e.g., within the VIDACH data structure in memory 110b). It is noted that response 301b could include no achievement records if no achievement records have been created for the current video. In such cases, client process 111 could cause VIDACH to store an empty data structure (as opposed to being set to null) to indicate that achievement records were retrieved but none exist. In summary, the process depicted in FIGS. 3A-3E causes each achievement record pertaining to the current video (if any have been created) to be retrieved and stored locally when the current user has administrative rights. This retrieval of the achievement records can be triggered by client process 111's handling of a stop, pause or scrub event.

Once the achievement records applicable to the current video have been retrieved (which again may be no achievement records), client process 111 can then implement a process for enabling the administrator to configure achievements for the current video. This process is represented in FIGS. 4A-4H.

Figure 4A:
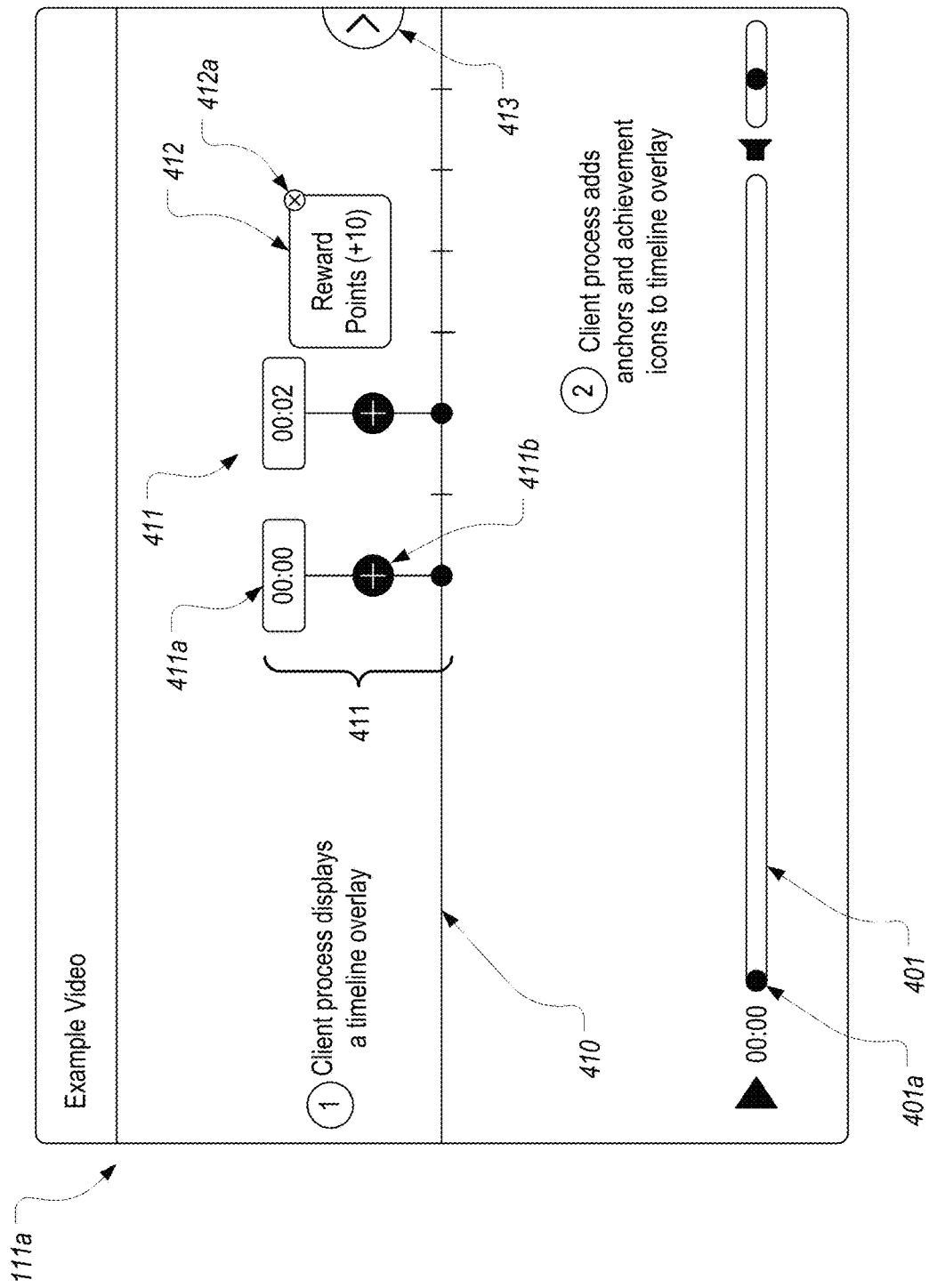
FIGS. 4A-4H illustrate a process by which the administrator can configure achievements to be presented during playback of a particular video.

FIG. 4A illustrates an example of the user interface of video player 111a as it may appear during this process. As is typical, video player 111a can include a progress bar 401 that includes a playhead 401a and corresponding timer which define the current playback position. For purposes of this example, it will be assumed that the administrator has stopped or paused playback at time 00:00 or has moved playhead 401a to 00:00 (e.g., by dragging it to the left end of progress bar 401).

In response to receiving the achievement records applicable to this video in steps 5a-5b of FIG. 3E, client process 111 can generate and display a timeline overlay 410 on (or in conjunction with) video player 111a as represented as step 1 in FIG. 4A. Client process 111 may typically generate timeline overlay 410 using HTML that can be displayed in browser 110 in a layer overtop video player 111a. Timeline overlay 410 can have a length that corresponds to the length of the loaded video, but client process 111 may cause only a portion of timeline overlay 410 corresponding to the current playback position to be displayed (e.g., a 20 second span around the current playback position). In such cases, as the playback position is adjusted, client process 111 can also adjust the display of timeline overlay 410 so that the portion of timeline overlay 410 corresponding to the current playback position is always visible and accessible to the administrator. In some embodiments, client process 111 can accomplish this by handling scrub events that video player 111a may generate during playback or in response to manual adjustments to the playback position.

As part of generating and displaying timeline overlay 410, in step 2, client process 111 can also add various elements to timeline overlay 410 based on the video achievements it received from server process 101 that are now stored in memory 110b. These elements include an anchor 411 and a corresponding achievement logo 412 that are positioned at the corresponding location within timeline overlay 410. For example, the achievement record having a GUID of GUID1 defines that an achievement of type IssueVirtualCurrency having a value of 10 should be awarded at the playback position of 2 seconds. Therefore, FIG. 4A shows that an anchor 411 has been added to timeline overlay 410 at the position that corresponds to playback position 00:02 with an achievement icon defining the issuance of 10 reward points to its side. Although not visible in FIG. 4A, client process 111 could also add an anchor 411 and achievement icon 412 for the IssueCertificate achievement to timeline overlay 410 at the position that corresponds to playback position 00:55.

In addition to adding an anchor 411 and achievement icon 412 for each achievement record, client process 111 can also maintain an anchor 411 at the position representing the current playback position. For example, in FIG. 4A, the current playback position is 00:00 and therefore client process 111 has caused an anchor to appear on timeline overlay 410 at the position corresponding to the 00:00 playback position. As the playback position is adjusted, client process 111 can likewise adjust this anchor 411.

Each anchor 411 includes a position indicator 411a which defines the playback position with which the anchor is associated. Each anchor 411 can also include an add button 411b (or other type of user input element) which can be selected to add an achievement at the corresponding playback position. For example, if the administrator were to select the add button 411b of the anchor 411 when at playback position 00:00, client process 111 would initiate the process for adding an achievement to be awarded when playback reaches 00:00 as will be further described below.

Timeline overlay 410 may also include navigation elements 413 (only one of which is shown in FIG. 4A) to allow the administrator to navigate through timeline overlay 410. For example, if the administrator were to select navigation element 413 in FIG. 4A, client process 111 could cause timeline overlay 410 to be advanced (e.g., by changing the segment that is visible within video player 111a) and could also instruct video player 111a to jump forward a corresponding amount.

Client process 111 can also cause a delete button 412a to be displayed with each achievement icon 412. As will be further described below, if the administrator selects delete button 412a, client process 111 can initiate a process for deleting the corresponding achievement record. As indicated by the anchor 411 at playback position 00:02 including add button 411b, more than one achievement can be defined at a particular playback position.

Figure 4B:
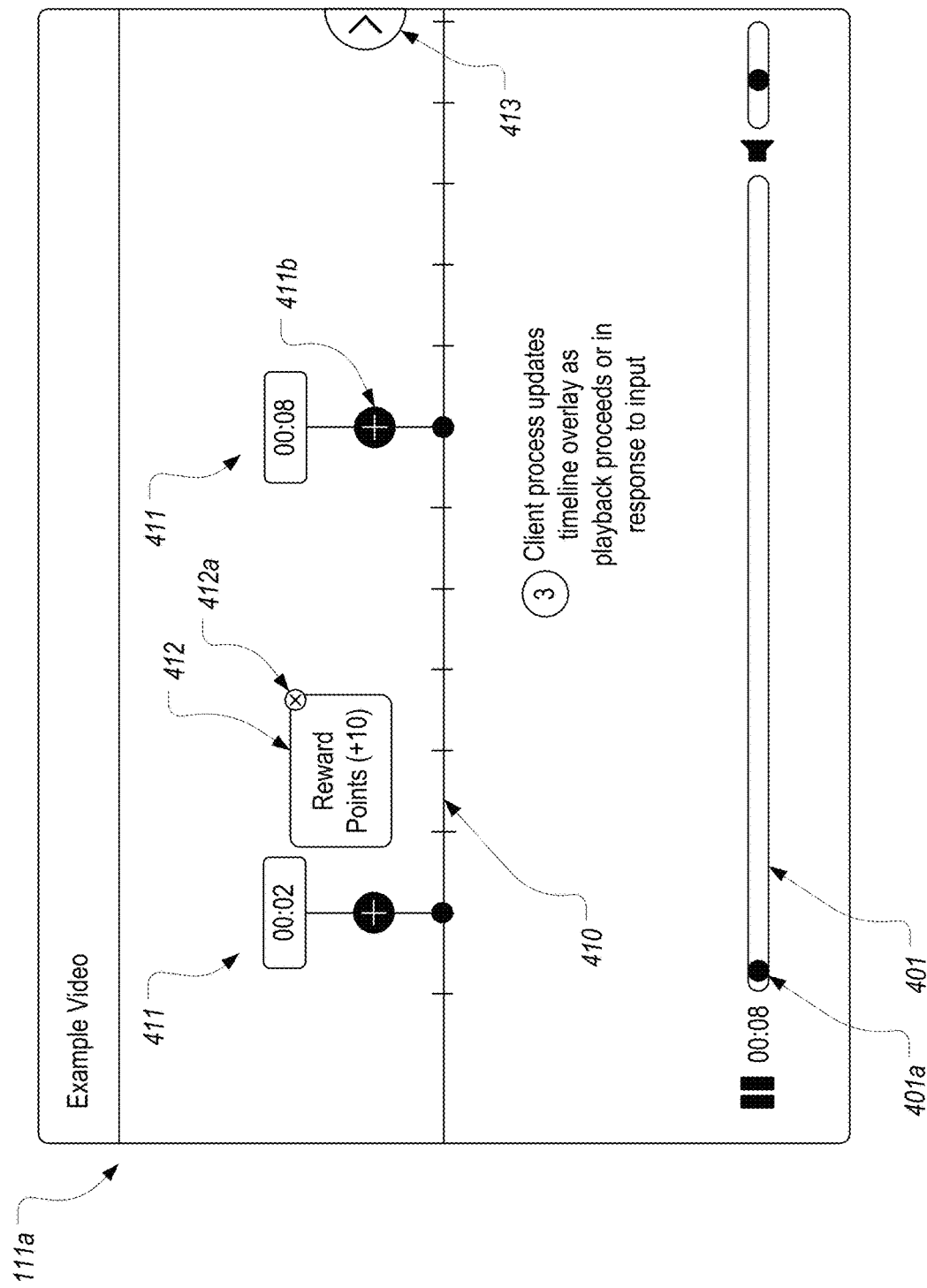
Figure 4C:
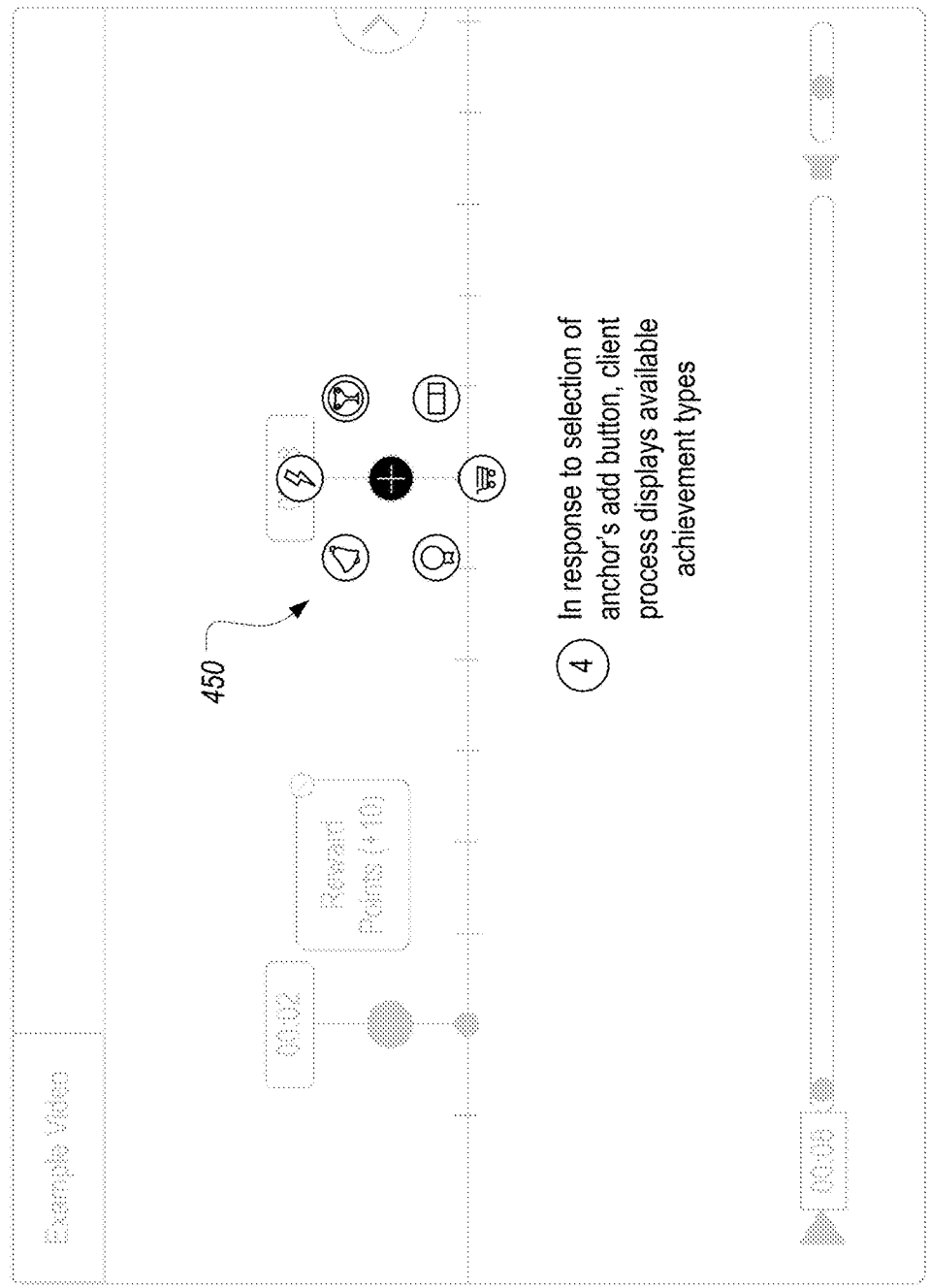

Turning now to FIG. 4B, it is assumed that the administrator has commenced playback of the video and that playback has reached 00:08. As mentioned above, as playback proceeds, client process 111 can continuously update the display of timeline overlay 410 as represented in step 3. Accordingly, in FIG. 4B, the portion of timeline overlay 410 corresponding to the first 13 seconds of the video are now visible. Because playback is currently at 00:08, client process 111 has updated timeline overlay 410 so that an anchor 411 appears at the 00:08 position.

At this point, it will be assumed that the administrator selects add button 411b of the anchor 411 at position 00:08. Upon detecting the selection of add button 411b, client process 111 can generate and display a dialog 450 that presents the administrator with the option of selecting a particular achievement type (or command) for an achievement to be added at time 00:08 as represented in step 4 of FIG. 4C. In this example, dialog 450 is in the form of a number of icons that encircle add button 411b where each icon represents a different achievement type. As with timeline overlay 410, client process 111 may employ HTML to render dialog 450 in the appropriate location relative to video player 111a and timeline overlay 410.

Figure 4D:
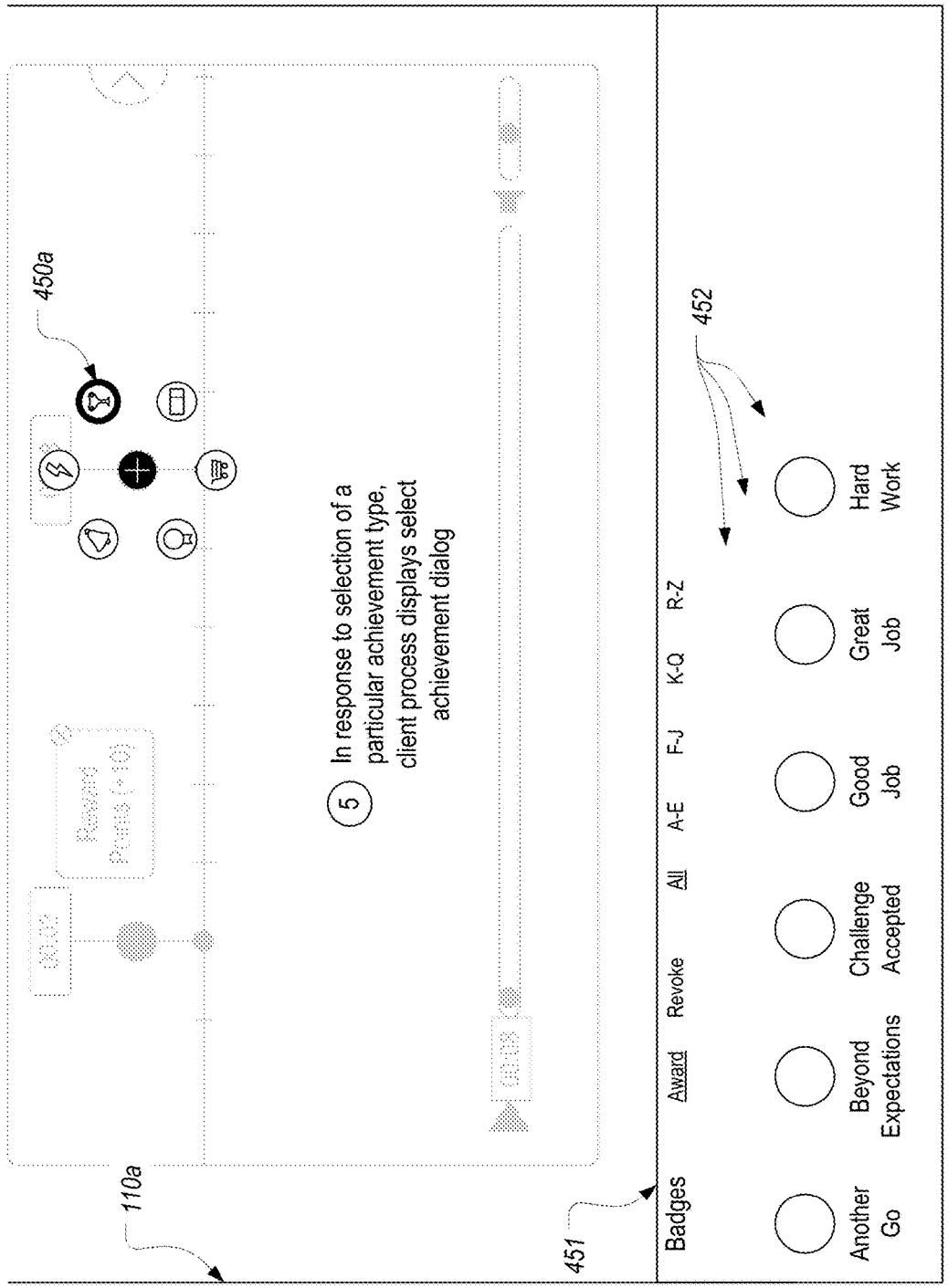

As shown in FIG. 4D, it will be assumed that the administrator selects icon 450a which represents the Award-Badge achievement type. In response, in step 5, client process 111 can generate and display a select achievement dialog 451. As shown, select achievement dialog 451 could be displayed within browser 110a. Select achievement dialog 451 can be customized based on the type of achievement the administrator selected from dialog 450. In this example, select achievement dialog 451 displays six possible badges 452 that can be awarded when a user reaches 00:08 while watching the video.

Figure 4E:
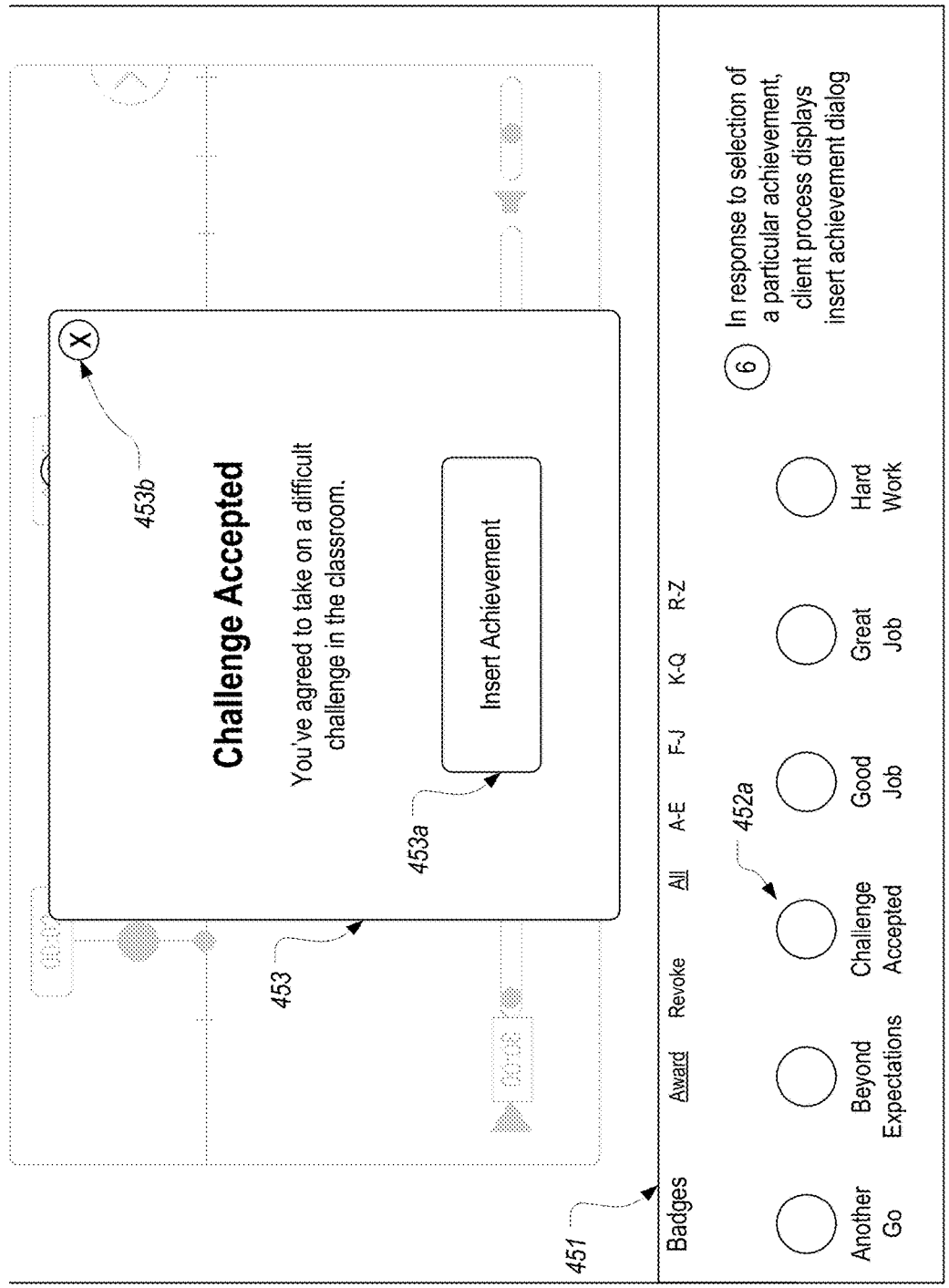

In FIG. 4E, it is assumed that the administrator selected badge 452a, the Challenge Accepted badge. In response, in step 6, client process 111 can generate and display an insert achievement dialog 453 which includes an insert button 453a and a cancel button 453b. Insert achievement dialog 453 enables the administrator to confirm whether to proceed with the creation of the selected achievement for the selected playback position. Again, client process 111 could use HTML to generate and display insert achievement dialog 453 within browser 110a.

Figure 4F:
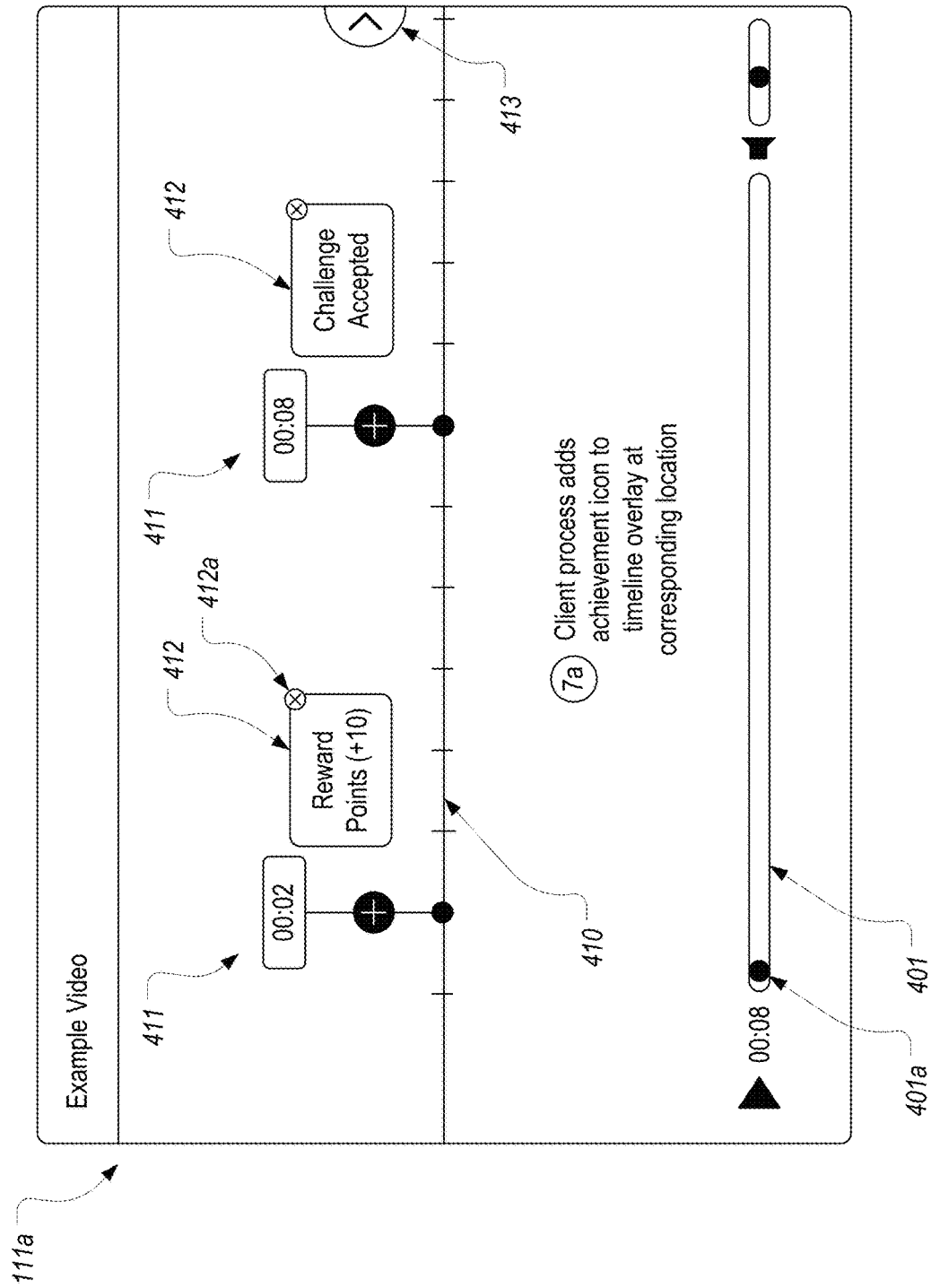

In FIG. 4F, it is assumed that the administrator selected insert button 453a, and therefore, in step 7a, client process 111 has added an anchor 411 to timeline overlay 410 at position 00:08 along with an achievement icon 412 that identifies the Challenge Accepted badge. As represented in FIG. 4F, client process 111 can be configured to pause playback of the video during this process (e.g., in response to the selection of add button 411b).

Figure 4G:
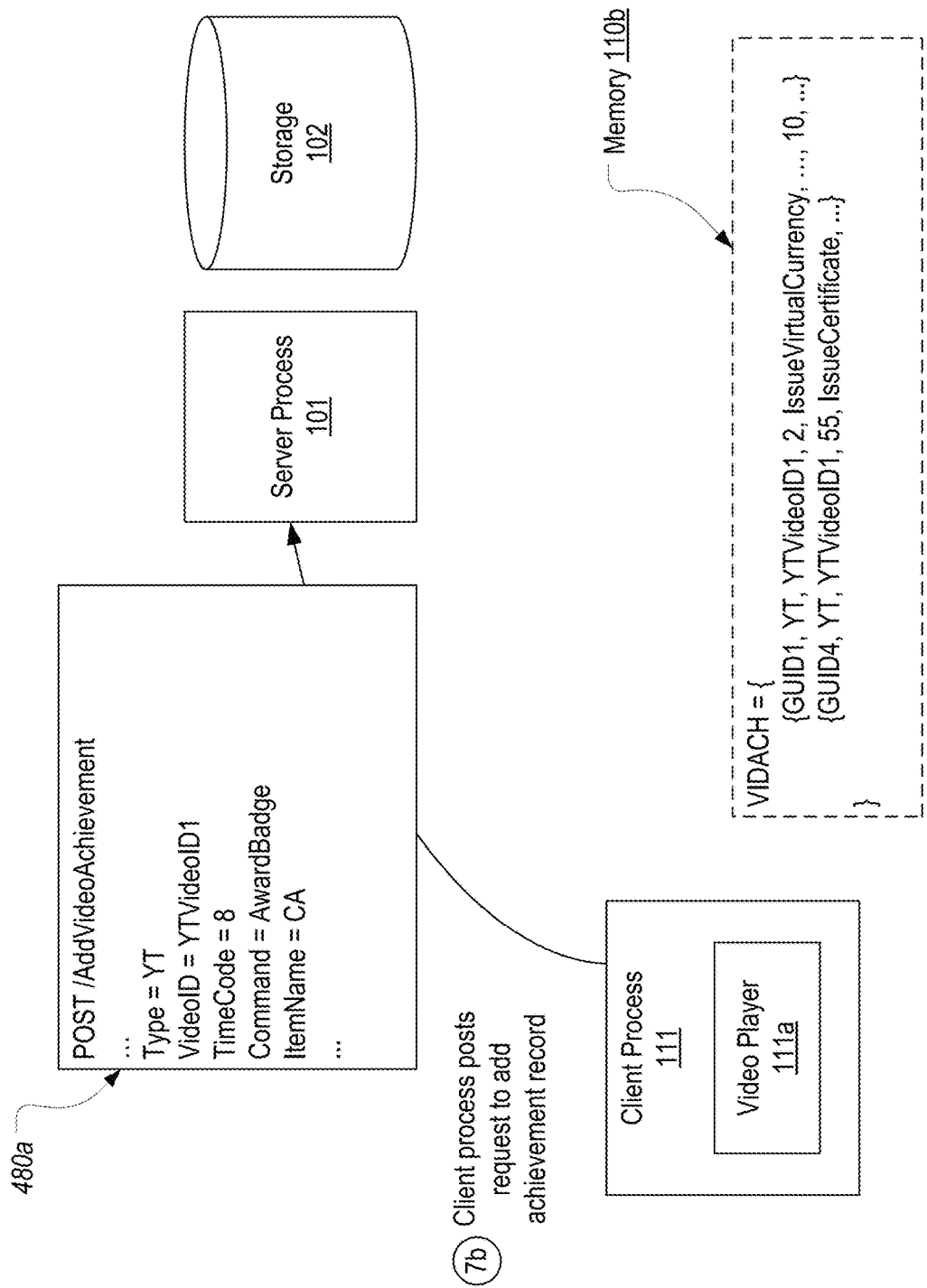

In addition to updating timeline overlay 410, client process 111 can also generate and send a request to create an achievement record for the selected achievement as represented in step 7b of FIG. 4G. As shown, client process 111 could send a request 480a to server process 101 which defines all elements of the achievement record except for a GUID. In this example, it is assumed that request 480a is in the form of an HTTP Post request to the AddVideoAchievement endpoint of server API 101a.

Figure 4H:
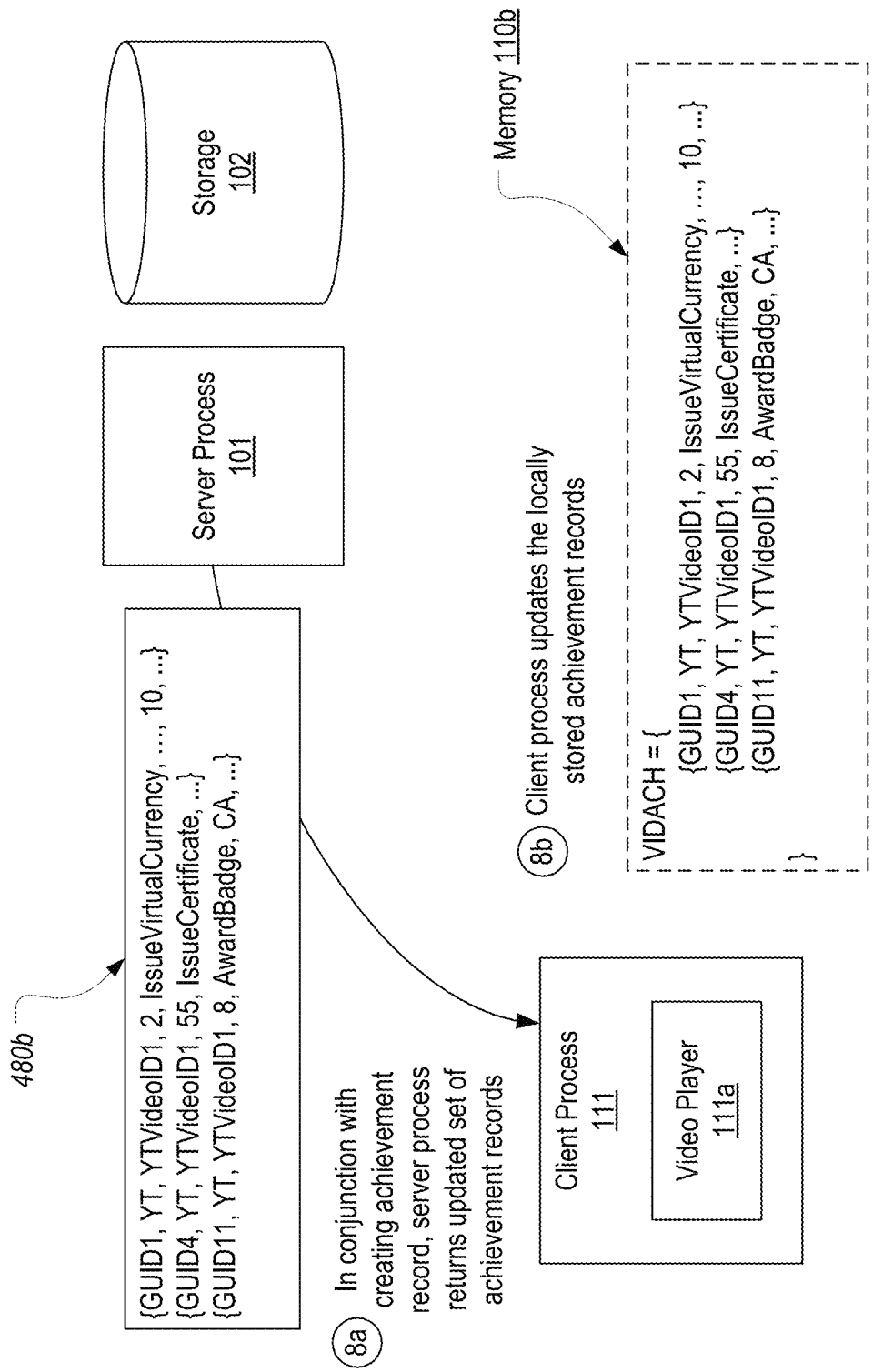

As shown in FIG. 4H, server process 101 can process request 480a by adding an achievement record to data structure 102a, including generated a GUID for the added record, and then, in step 8a, can return an updated set of achievement records for the current video. In particular, server process 101 can query storage 102 to obtain all achievement records matching YT and YTVideoID1 from data structure 102a and return them in response 480b (including any that may have been created by another administrator in the interim). Finally, in step 8b, client process 111 can update the VIDACH data structure in memory 110b to reflect the updated set of achievement records. The process represented in FIGS. 4A-4H can be repeated as the administrator continues to configure achievements for the particular video.

Although not shown in the figures, the process for deleting an achievement record can be substantially the same as the process for creating an achievement record. For example, if the administrator selects delete button 412a on a particular achievement icon, client process 111 could display a dialog similar to insert achievement dialog 453 to prompt the administrator to confirm the deletion. Then, client process 111 could update timeline overlay 410 to remove the corresponding anchor and achievement icon and send a request to server process 101 to delete the corresponding achievement record from data structure 101a. This request could be in the form of an HTTP Post request to a DeleteVideoAchievement endpoint of server API 101a which includes the GUID of the achievement record to be deleted. Server process 101 could then return an updated set of achievement records that reflects the deletion.

As can be seen, each time the administrator adds an achievement to or deletes an achievement from a particular video, data structure 102a will be updated to reflect the current set of achievement records that are associated with that particular video. In this way, the administrator can use virtually any personal computing device to configure achievements. In some embodiments, data structure 102a may be specific to a particular entity or organization such as a school, a class, an office, etc. For example, the present invention could be used in a classroom environment in which the teacher is the administrator and therefore configures achievements that will apply to videos watched by his or her students. Accordingly, storage 102 could maintain multiple instances of data structure 102*a* where each instance is specific to a particular entity, organization, or grouping.

Figure 5A:
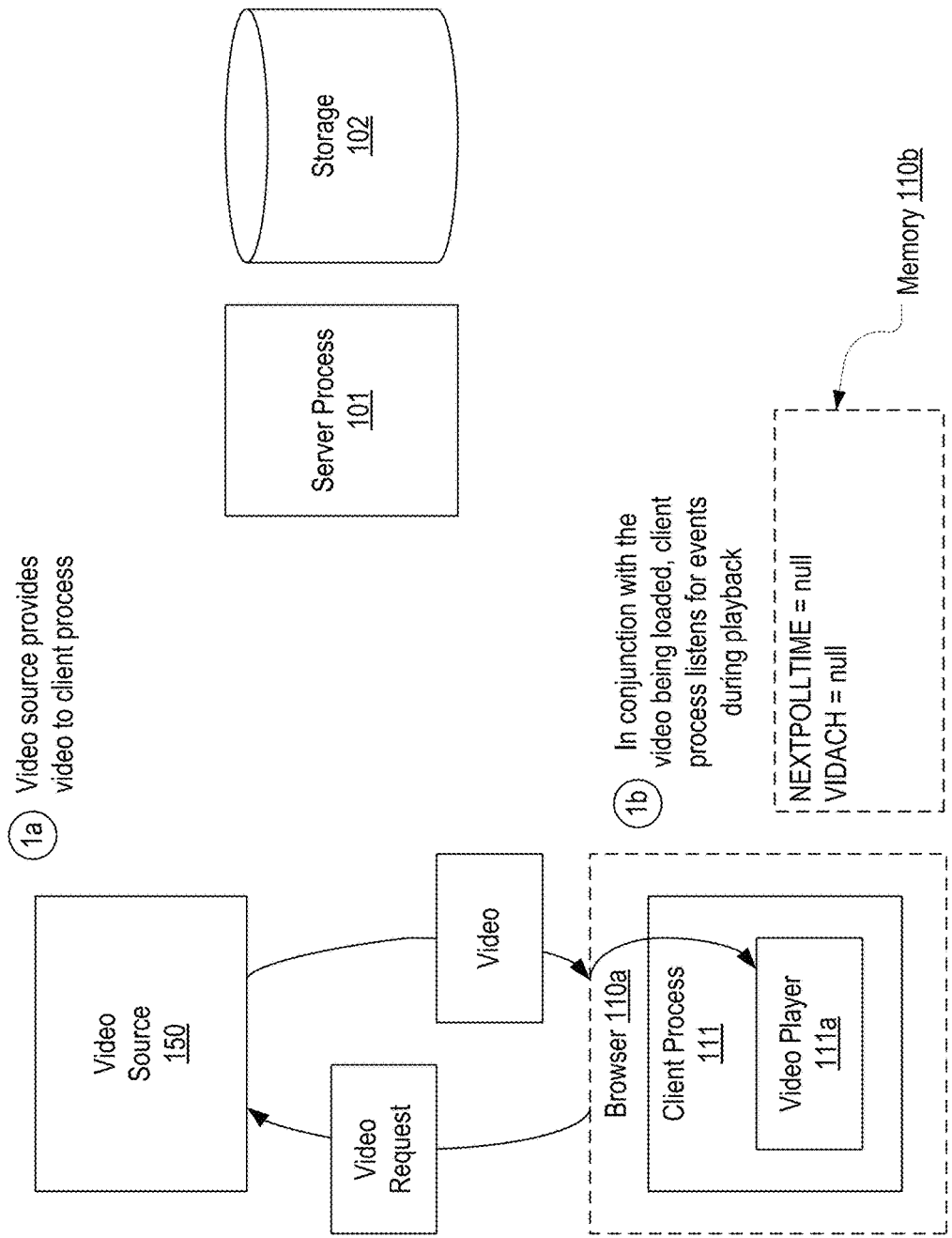

FIGS. 5A-5H illustrate how client process 111 can determine whether to award an achievement to a user that is watching a video within video player 111*a*. FIG. 5A shows that a user will access a video in a similar manner as an administrator. In other words, the same or similar client process 111 can be employed regardless of whether the individual is an administrator or a user. Accordingly, in step 1*a*, the user causes a video (which is assumed to be the same YouTube video having an ID of YTVideoID1) to be loaded into video player 111*a*, and in response, client process 111 registers to receive playback events from video player 111*a* in step 1*b*. In the context of a user, the relevant playback events can be play, resume and progress events (or their equivalents). In other words, when a user is watching a video in video player 111*a*, client process 111 can detect when the video is playing.

As shown in FIG. 5A, client process 111 can maintain the same or similar VIDACH data structure within memory 110*b* for the purpose of storing achievement records. Client process 111 can also maintain a NEXTPOLLTIME variable that can be used to limit the frequency at which client process 111 queries server process 101 for achievement records as will be described below.

FIG. 5B represents that the video has been loaded into video player 111*a* and a play, resume or progress event has been raised and received by client process in step 2*a*. In response to receiving this event, client process 111 can verify in step 2*b* that the current user is not an administrator prior to proceeding further. The role of step 2*b* is to ensure that the achievement awarding process is not performed for an administrator. In this example, because the current user is not an administrator (which could have been determined from a previous login), client process 111 will obtain the current playback position in step 2*c*.

Figure 5C:
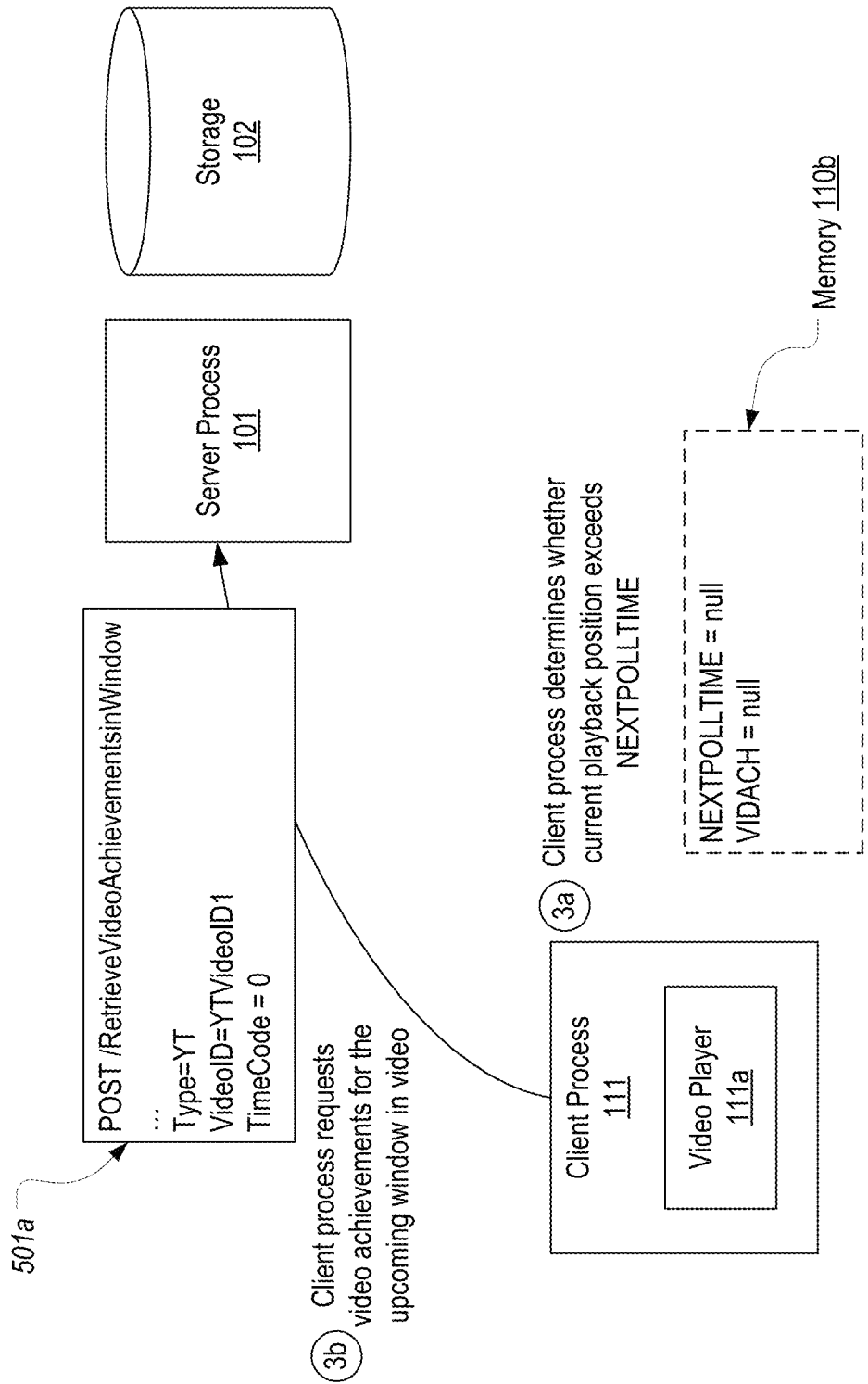
Figure 5D:
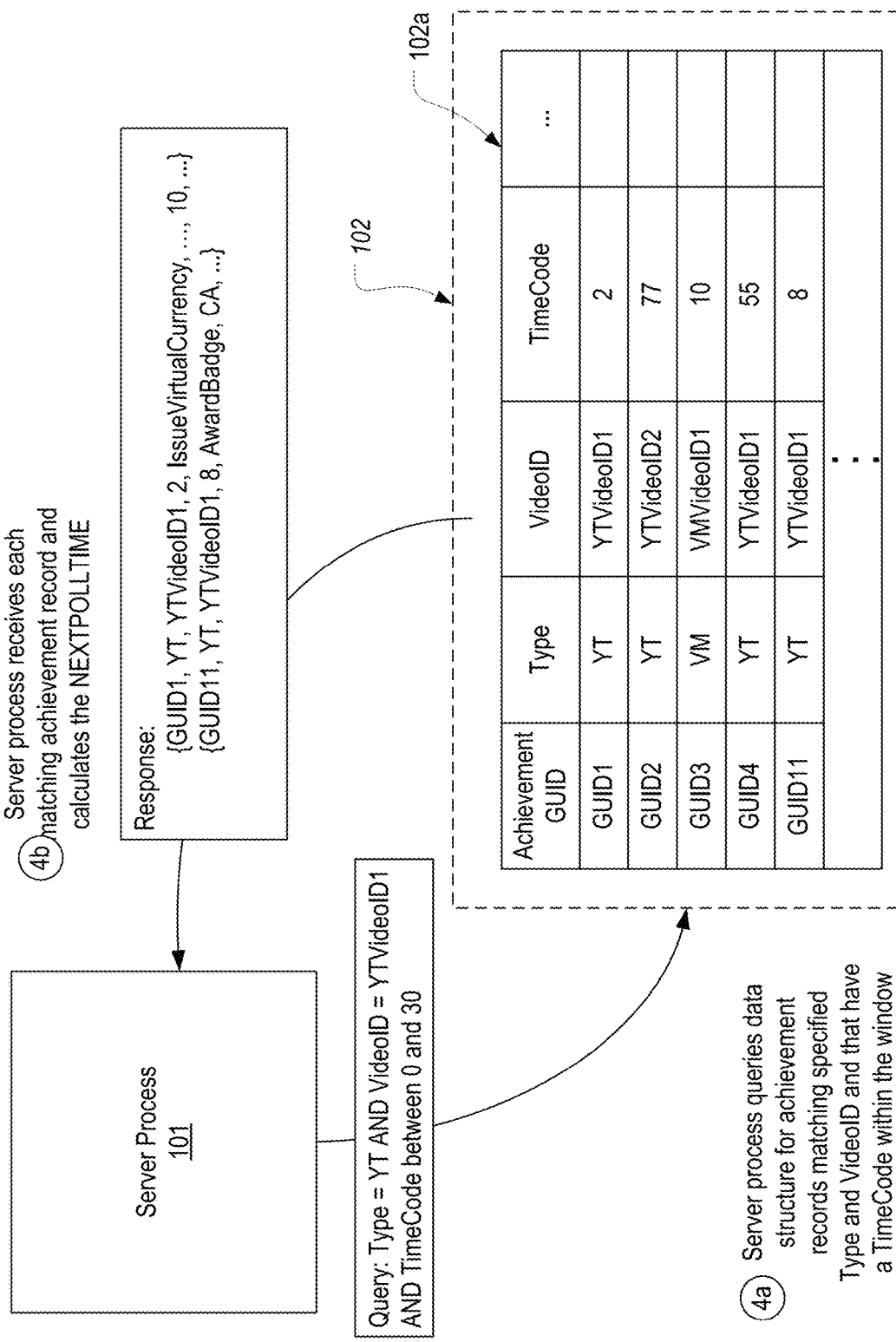

As represented in step 3*a* of FIG. 5C, the purpose of obtaining the current playback position from video player 111*a* is to compare it to the current value of the NEXTPOLLTIME variable in memory 110*b*. In this example, it will be assumed that this is the first iteration of the process and therefore the variable has not yet been set. In such a case, client process 111 can determine that the current playback position exceeds the NEXTPOLLTIME and will therefore proceed to send request 501*a* in step 3*b*. Request 501*a* can include the type and ID of the currently loaded video as well as the current playback position which is assumed to be 0 in this example. Request 501*a* is therefore similar to request 301*a* but includes the current playback position.

Server process 101 responds to request 501*a* in a similar manner as it responds to request 301*a* except that the query of data structure 101*a* is limited to achievement records having a TimeCode that falls within a window defined as the current playback position plus some defined offset. In this example, the offset is assumed to be 30 seconds. Therefore, in step 4*a* of FIG. 5D, server process 101 is shown as querying data structure 102*a* for all achievement records having a Type of YT, a VideoID of YTVideoID1 and a TimeCode between 0 and 30. In accordance with the example in FIGS. 4A-4H, this query will return two achievement records as shown in step 4*b*. Accordingly, unlike with an administrator, when a user is watching a video, server process 101 will not return all achievement records for the video, but will return only those within a window that is based on the current playback position.

As part of step 4*b*, server process 101 can calculate a new value of the NEXTPOLLTIME. In this example, it is assumed that server process 101 will calculate this value as the current playback position+20 seconds but any reasonable offset could be used and would likely be relative to the offset used to calculate the window. As will become apparent, the use of the window and the NEXTPOLLTIME ensures that client process 111 cannot be caused to submit requests for achievement records too frequently.

Figure 5E:
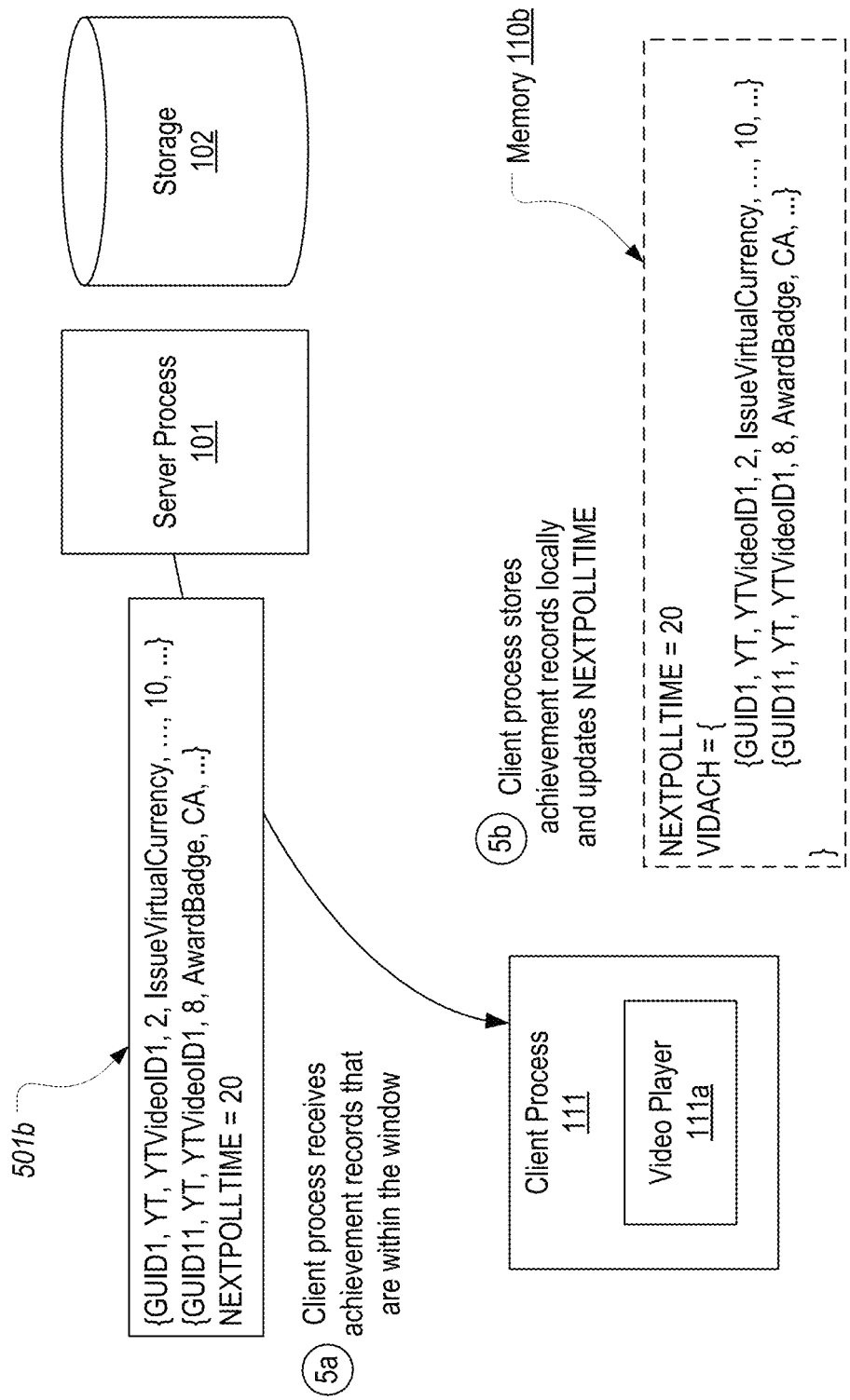

In step 5*a* shown in FIG. 5E, client process 111 receives response 501*b* which includes the matching achievement records and the NEXTPOLLTIME. In step 5*b*, client process 111 updates the NEXTPOLLTIME variable and the VIDACH data structure in memory 110*b* accordingly.

Figure 5F:
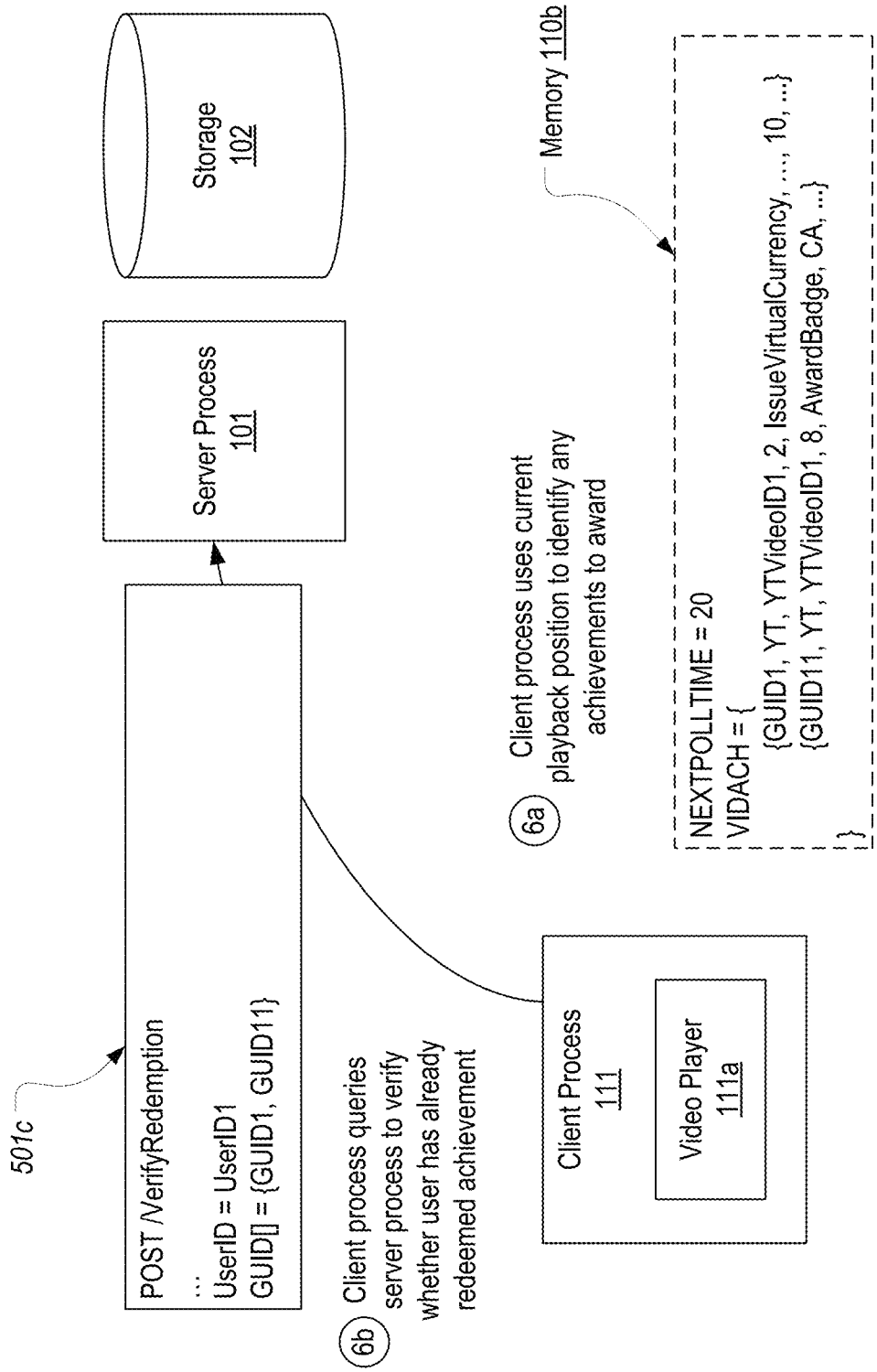

Next, in step 6*a* of FIG. 5F, client process 111 employs the current playback position to determine whether any achievements should be awarded to the user. This is accomplished by comparing the current playback position (which was assumed to be 0 but may have progressed some amount prior to this step) with the TimeCode values in each achievement record in the VIDACH data structure. If the TimeCode of a particular achievement record is equal to the current playback position or within some range of the current playback position (to ensure that no achievement records will be missed), client process 111 can then proceed to verify whether the user has already redeemed the corresponding achievement (assuming that the user can only redeem the achievement a single time).

In the present example, it will be assumed that client process 111 determines that both achievement records currently stored in memory 110*b* match the current playback position and therefore, in step 6*b*, client process 111 sends request 501*c* which includes the user's UserID (UserID1) and the GUID of each achievement record matched in step 6*a* (GUID1 and GUID11) to server process 101.

Figure 5G:
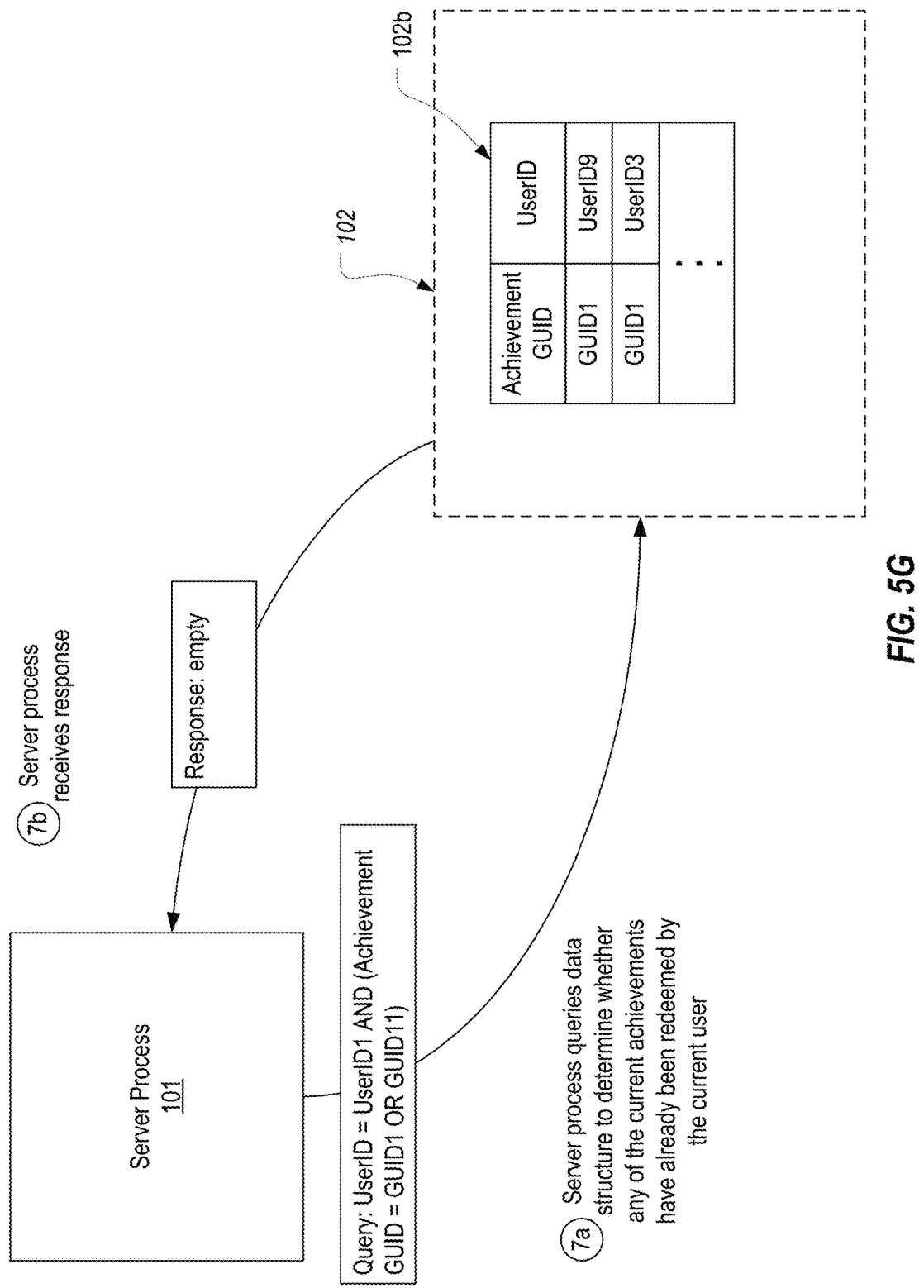

In step 7*a* shown in FIG. 5G, server process 101 will respond to request 501*c* by querying data structure 102*b* for records that include the specified UserID and any one of the specified GUIDs. In this example, it will be assumed that there are no matching records (i.e., UserID1 has not yet redeemed the achievements with GUIDs of GUID1 or GUID11), and therefore, server process 101 receives an empty response in step 7*b*.

Figure 5H:
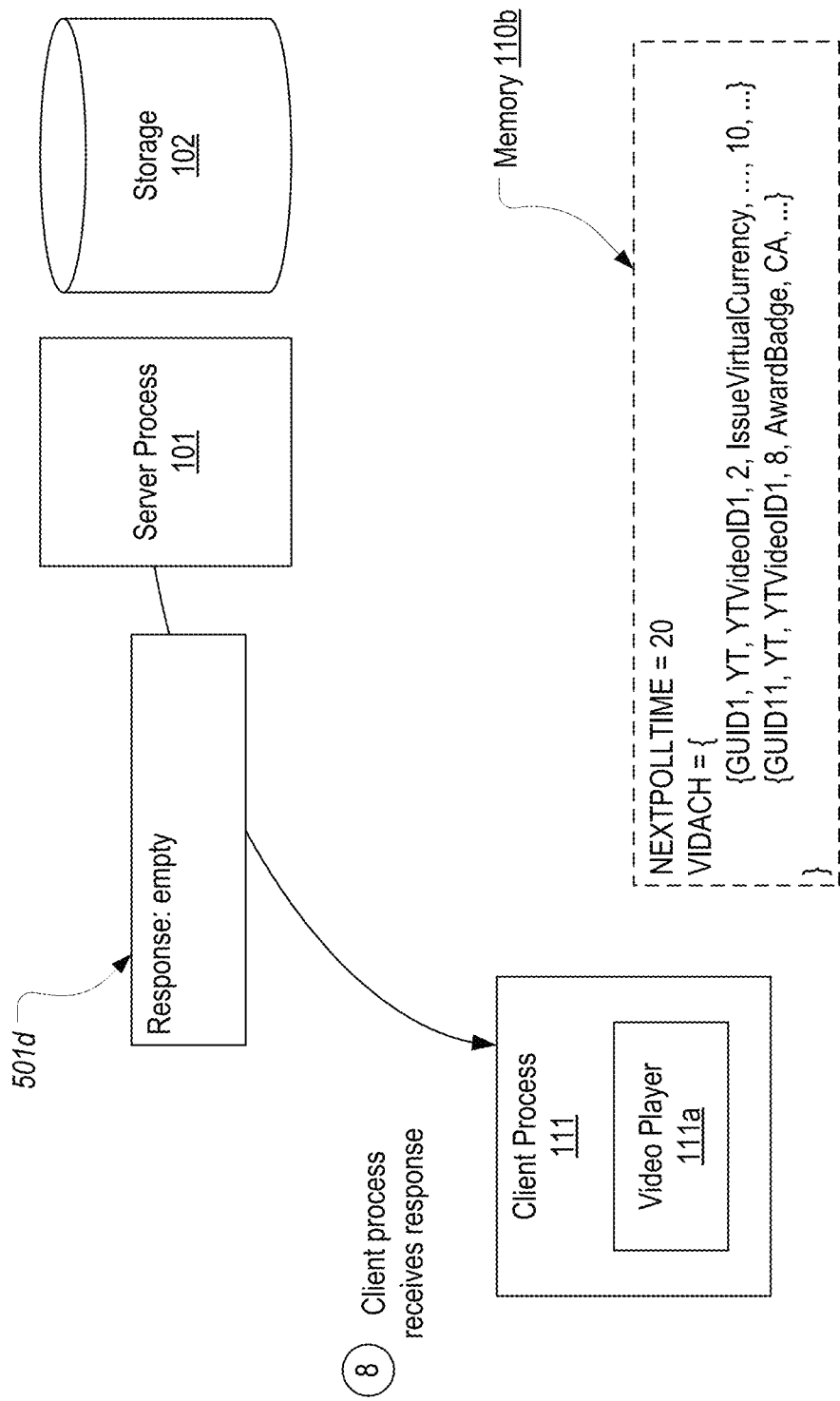

Finally, in step 8 of FIG. 5H, client process 111 receives response 501*d* indicating that UserID1 has not yet redeemed any of the specified GUIDs. Although not shown, for any GUID returned in response 501*d*, client process 111 could halt the process of awarded the corresponding achievement to ensure that the same achievement is not awarded more than once to the same user.

Because client process 111 has registered to receive play, pause and progress events, this process will be repeated each time the current playback position exceeds the NEXTPOLLTIME. In this example, client process 111 would repeat the process represented in FIGS. 5B-5H every 20 seconds of playback. Because of how this process is structured, if the user skips forward in a video, he or she will not be awarded achievements that are associated with the portion of the video that was skipped over. In particular, client process 111 ensures that only achievements within a current window are retrieved and then only selects achievements to award when those achievements fall within the current playback position+/−some range.

Figure 6A:
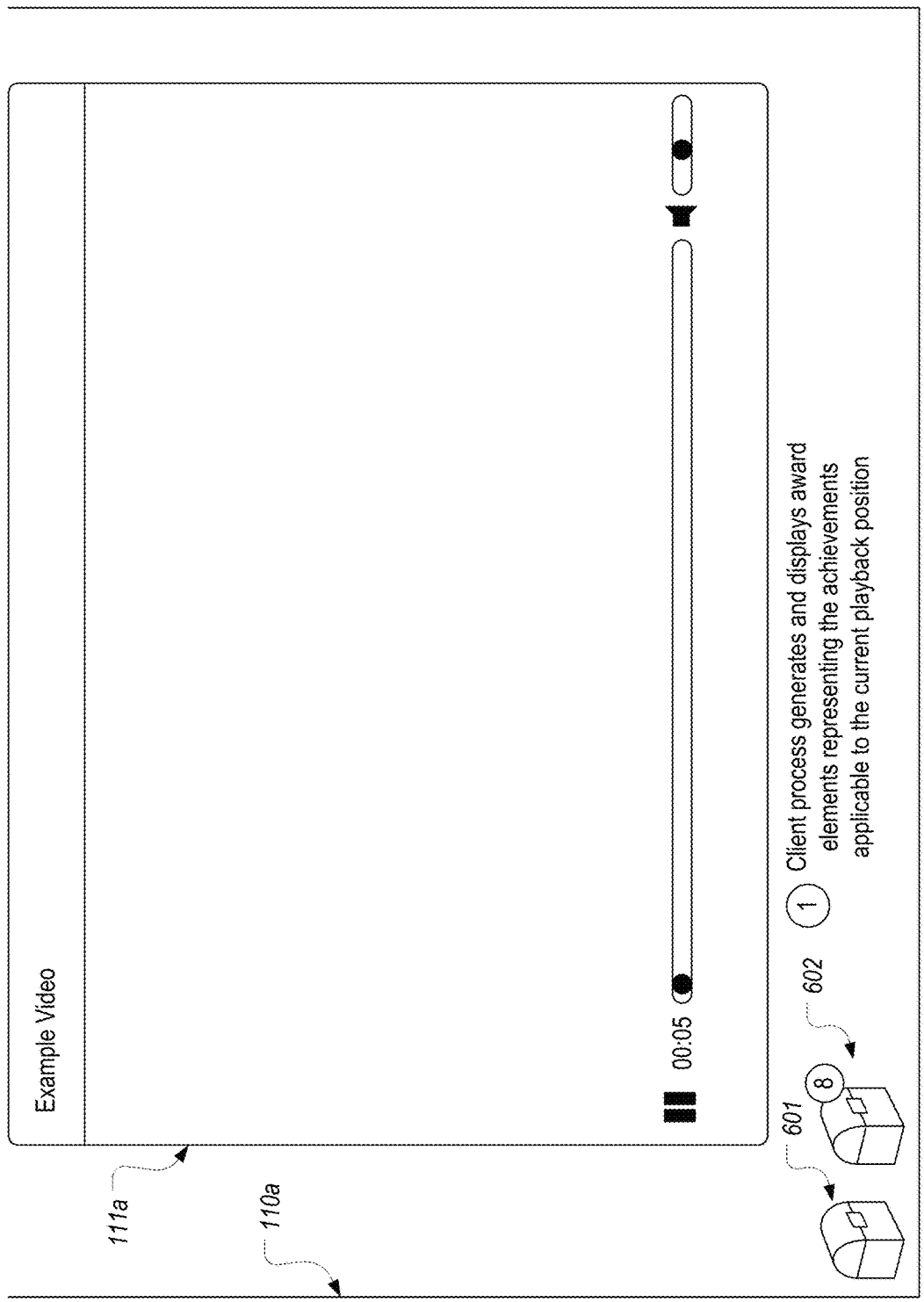
FIGS. 6A-6C illustrate how achievements can be displayed and redeemed during playback of a particular video.
Figure 6B:
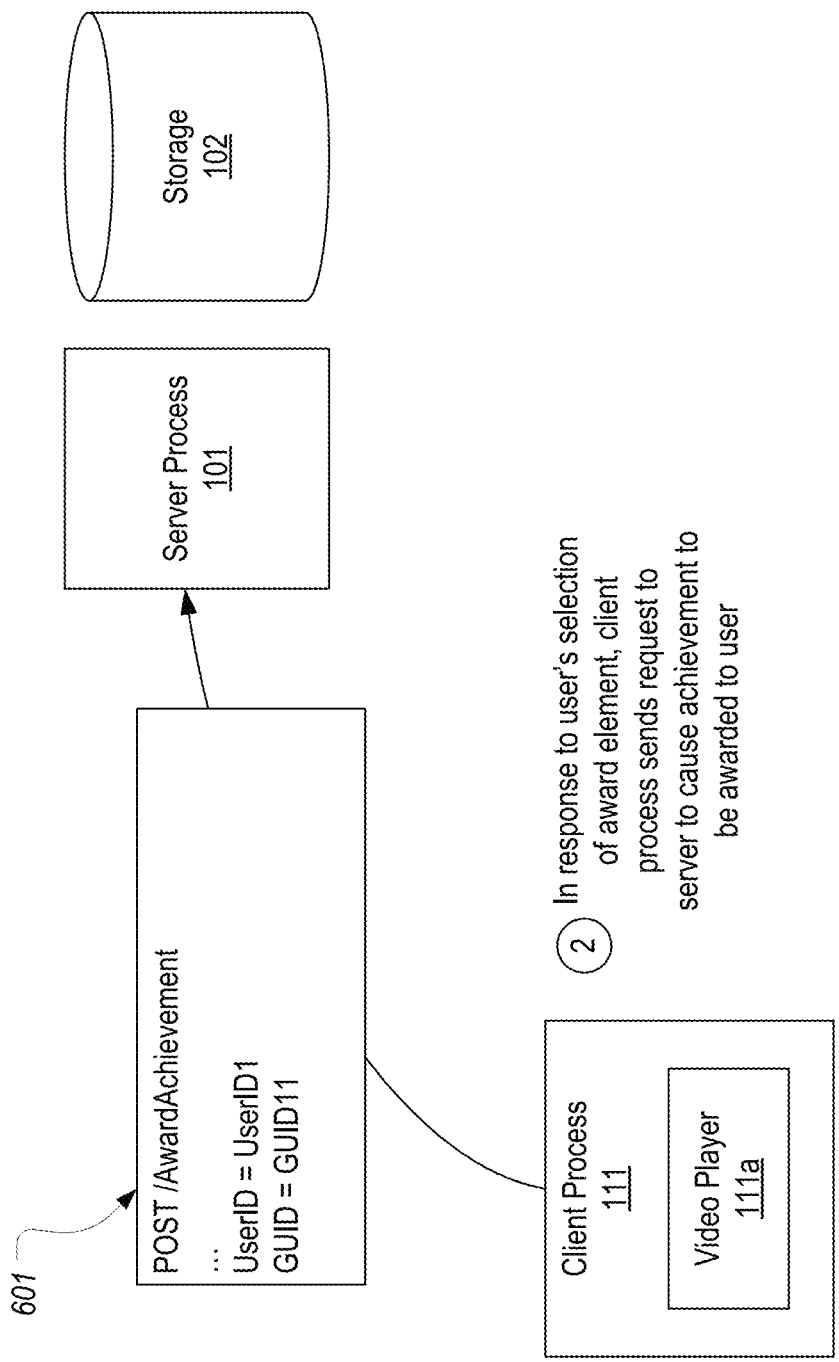
Figure 6C:
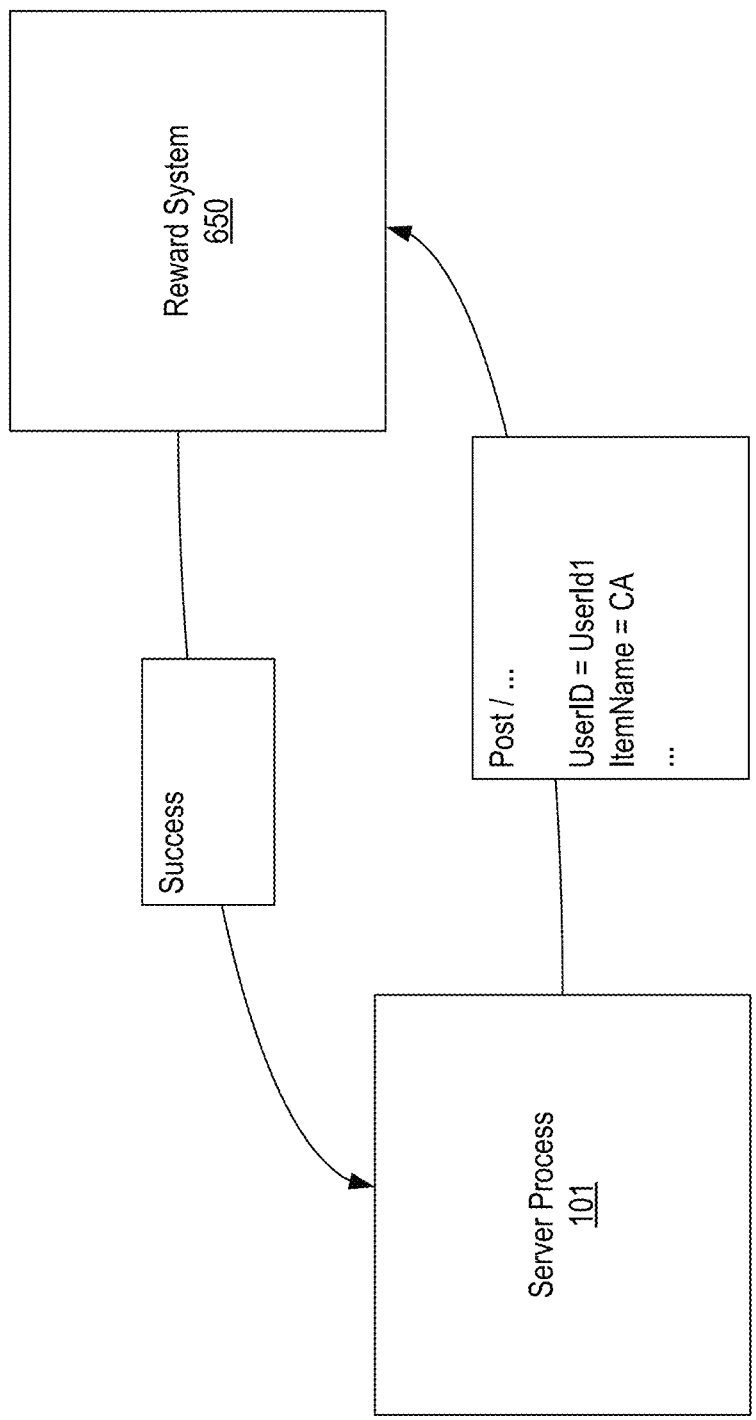

FIGS. 6A-6C illustrate how client process 111 actually awards (or presents) achievements during playback of a video. The process depicted in these figures can be performed after step 8 of FIG. 5H and only if client process 111 determines that there are matching achievements that have not yet been redeemed by the user.

FIG. 6A illustrates an example of video player 111a within browser 110a while the user (UserID1) is watching the video (YTVideoID1). As shown, after step 8 of FIG. 5H, client process 111 can proceed to generate and display an award element 601, 602 for each of the applicable achievement records as represented in step 1. In this example, it is assumed that award element 601 corresponds to GUID1 and award element 602 corresponds to GUID11. Client process 111 may generate award elements 601, 602 using HTML and may customize their appearance and functionality based on the contents of the corresponding achievement records. Each of award elements 601, 602 can be selectable thereby allowing the user to click on the element to redeem the achievement.

Some achievements may have a time limit for redemption. For example, it is assumed that the GUID11 achievement record defines that the Challenged Accepted badge should only be redeemable for a specified amount of time. Therefore, client process 111 has generated and displayed a timer in conjunction with award element 602. Once this timer elapses, client process 111 can remove award element 602 to prevent the user from redeeming the achievement. The use of a timer can ensure that the user must remain watching the video to redeem an achievement.

If the user selects either of award elements 601, 602, client process 111 will be notified and can initiate a process for awarding the achievement to the user. For example, as shown in FIG. 6B, it is assumed that the user selected award element 602 before the timer expired and therefore, in step 2, client process 111 sends request 601 containing the user's UserID and the GUID for the selected achievement. Although not shown, server process 101 will respond to request 601 by adding a record to data structure 102b to map GUID11 to UserID1.

As mentioned above, the present invention can be employed with a number of different reward systems which may be the source of the information defining achievements available to be awarded. In such cases, in addition to updating data structure 102b to reflect that the user has redeemed a particular achievement, server process 101 can also notify the corresponding reward system that the achievement should be awarded to the particular user. For example, in FIG. 6C, server process 101 is shown as sending a request to reward system 650 which identifies the UserID (UserID1) of the user to whom the achievement should be awarded, the ItemName (CA) of the achievement to be awarded, and any other information required by reward system 650 to issue a reward. Reward system 650 can respond with a success message which server process 101 can then employ to notify client process 111. Client process 111 may then generate and display any suitable notification to the user to inform the user that the achievement has been officially awarded within reward system 650. In this way, the video achievement system of the present invention can be integrated with a number of reward systems.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a client process and a server process, for integrating achievements into playback of a video, the method comprising:

during playback of a video within a video player, generating and displaying, by the client process, a timeline overlay in conjunction with the video player, the client process including in the timeline overlay an anchor that corresponds with a particular playback position within the video;

receiving input that selects an add feature associated with the anchor;

in response to the selection of the add feature, generating and displaying an option to define an achievement to be associated with the particular playback position to which the anchor corresponds;

receiving input that defines the achievement;

sending a request to the server process to create an achievement record that associates the input that defines the achievement with the particular playback position within the video;

during subsequent playback of the video to a user, obtaining a current playback position of the video;

sending, by the client process and to the server process, a request that includes the current playback position and an identifier of the video; and in response to the request, receiving, from the server process, a set of achievement records where each achievement record is associated with the video and with a particular playback position that is within an offset from the current playback position.

2. The method of claim 1, wherein the client process causes the anchor to be included in the timeline overlay at a position that corresponds with a current playback position.

3. The method of claim 1, further comprising:

in response to the request, receiving from the server process, the achievement record that the server process created; and updating the timeline overlay to include an achievement icon based on the achievement record.

4. The method of claim 3, wherein the client process includes the achievement icon at a position that corresponds with the particular playback position within the video.

5. The method of claim 3, wherein the achievement icon includes a delete option, the method further comprising:

in response to input that selects the delete option, sending, by the client process, a delete request to the server process, the delete request identifying the achievement record on which the achievement icon was based.

6. The method of claim 5, further comprising:

updating the timeline overlay to remove the achievement icon.

7. The method of claim 1, further comprising:

updating the timeline overlay to include, for each achievement record, an achievement icon at a position that corresponds with the particular playback position with which the corresponding achievement is associated.

8. The method of claim 7, wherein each achievement record includes a unique identifier of the corresponding achievement, an identifier of the video, and an identifier of the particular playback position.

9. The method of claim 1, wherein the request to create the achievement record includes an identifier of the video and a type of the video.

10. The method of claim 1, further comprising:

in conjunction with the subsequent of the video, generating and displaying an award element for at least one of the achievement records in the set.

11. The method of claim 10, wherein the client process generates and displays an award element only for achievement records in the set that are associated with achievements that have not yet been redeemed by the user.

12. The method of claim 11, wherein the client process determines whether an achievement has been redeemed by the user by sending a request that includes a unique identifier of the corresponding achievement record and an identifier of the user to the server process.

13. The method of claim 10, further comprising:

receiving input that selects one of the displayed award elements; and sending, to the server process, a request that includes a unique identifier of the corresponding achievement record and an identifier of the user.

14. The method of claim 13, further comprising:

in response to receiving the request that includes the unique identifier of the corresponding achievement record and the identifier of the user, sending, by the server process and to a rewards system, a request that includes the identifier of the user and a reward-system-specific identifier for the corresponding achievement.

15. One or more computer storage media storing computer-executable instructions which when executed by one or more processors implement a method for integrating achievements into playback of a video, the method comprising:

in response to a playback event during playback of a video, sending, by a client process, a request to a server process for achievement records that are associated with the video;

receiving, from the server process, a set of achievement records where each achievement record associates a particular achievement with a particular playback position within the video;

generating and displaying, by the client process, a timeline overlay in conjunction with the video player;

adding to the timeline overlay and for each achievement record, an achievement icon at a position that corresponds with the particular playback position with which the corresponding achievement is associated;

during subsequent playback of the video to a user, obtaining a current playback position of the video;

sending, by the client process and to the server process, a request that includes the current playback position and an identifier of the video; and in response to the request, receiving, from the server process, a set of achievement records where each achievement record is associated with the video and with a particular playback position that is within an offset from the current playback position.

16. The computer storage media of claim 15, wherein the method further comprises:

displaying an anchor along the timeline overlay, the anchor corresponding with a current playback position within the video; and updating the display of the anchor as the current playback position is updated.

17. The computer storage media of claim 16, wherein the method further comprises:

receiving input that selects an add feature associated with the anchor;

in response to the selection of the add feature, generating and displaying an option to define an achievement to be associated with the current playback position to which the anchor corresponds;

receiving input that defines the achievement; and sending a request to the server process to create an achievement record that associates the input that defines the achievement with the current playback position within the video.

18. The computer storage media of claim 17, wherein the set of achievement records received during the subsequent playback includes an achievement record that was created in response to the request to create the achievement record.

19. A method, performed by a client process and a server process, for integrating achievements into playback of a video, the method comprising:

during a first playback of a video within a video player to a first user, generating and displaying, by the client process, a timeline overlay in conjunction with the video player, the client process including in the timeline overlay and anchor that corresponds with a particular playback position within the video;

receiving input from the first user, the input defining an achievement to be associated with the particular playback position to which the anchor corresponds;

sending a request to the server process to create an achievement record that associates the achievement with the particular playback position within the video;

in response to the request, creating, by the server process, a first achievement record that associates the achievement with the particular playback position within the video;

monitoring subsequent playback of the video while a second user is viewing the video;

in response to a playback event during the subsequent playback, obtaining a current playback position of the video;

sending, by the client process and to the server process, a request that includes the current playback position and an identifier of the video;

in response to the request, receiving, from the server process, a set of achievement records where each achievement record is associated with the video and with a particular playback position that is within an offset from the current playback position, the set of achievement records including the first achievement record; and in conjunction with the subsequent playback of the video, generating and displaying an award element for at least one of the achievement records in the set.

20. The method of claim 19, further comprising:

receiving input that selects one of the displayed award elements; and sending, to the server process, a request that includes a unique identifier of the corresponding achievement record and an identifier of the user.

* * * * *